US012632296B1

(12) United States Patent
    Galvin

(10) Patent No.: US 12,632,296 B1
(45) Date of Patent: May 19, 2026

(54) EXECUTING SELF-EVOLVING PROPERTY GRAPHS ON GPU HARDWARE

(71) Applicant: AtomBeam Technologies Inc., Moraga, CA (US)

(72) Inventor: Brian Galvin, Silverdale, WA (US)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

(21) Appl. No.: 19/443,002

(22) Filed: Jan. 7, 2026

Related U.S. Application Data

(60) Provisional application No. 63/875,311, filed on Sep. 3, 2025.

(51) Int. Cl.
   G06F 9/48 (2006.01)
   G06F 9/50 (2006.01)

(52) U.S. Cl.
   CPC .............. G06F 9/4881 (2013.01); G06F 9/50 (2013.01)

(58) Field of Classification Search
   CPC ................................. G06F 9/4881; G06F 9/50
   See application file for complete search history.

(56) References Cited

U.S. PATENT DOCUMENTS

| | | | |
|---|---|---|---|
| 2013/0057563 A1* | 3/2013 | Persson | G06F 9/485 |
| | | | 345/522 |
| 2020/0042362 A1* | 2/2020 | Cui | G06N 3/0985 |
| 2021/0149734 A1* | 5/2021 | Gurfinkel | G06F 9/5027 |
| 2021/0248115 A1* | 8/2021 | Jones | G06F 9/5066 |
| 2023/0084951 A1* | 3/2023 | Fontaine | G06F 9/541 |
| | | | 719/328 |
| 2023/0176933 A1* | 6/2023 | Stevenson | G06F 8/76 |
| | | | 719/328 |
| 2024/0152413 A1* | 5/2024 | Stevenson | G06F 9/544 |
| 2025/0258937 A1* | 8/2025 | Crabtree | G06N 5/02 |

(Continued)

OTHER PUBLICATIONS

Awad et al., "Dynamic Graphs on the GPU," 2020 IEEE International Parallel and Distributed Processing Symposium (IPDPS), New Orleans, LA, USA, 2020 (Year: 2020).*

*Primary Examiner* — Benjamin C Wu

(74) *Attorney, Agent, or Firm* — GALVIN PATENT LAW LLC; Brian R. Galvin

(57) ABSTRACT

A system and method for executing self-evolving property graphs on GPU hardware for unbounded experiential processing. The system stores a dynamic property graph comprising event and communication vertices in GPU memory. Input streams are projected to graph vertices through specialized operators. Multiple GPU-executable operator kernels transform the graph through geometric operations including diffusion, geodesic computation, and curvature analysis. These operators are captured as a directed acyclic graph that executes repeatedly without external scheduling, with execution frequency adjusted based on a logarithmic relationship with input stream density. A compression mechanism identifies and removes redundant graph elements based on geometric properties, maintaining memory growth proportional to the logarithm of processed inputs. The system enables continuous transformation of experiential inputs into cognitive trajectories while avoiding the linear or quadratic memory scaling that limits conventional architectures. Applications include real-time decision support, pattern recognition, and autonomous system control.

17 Claims, 9 Drawing Sheets

(56) References Cited

U.S. PATENT DOCUMENTS

| | | | | |
|---|---|---|---|---|
| 2025/0259085 A1* | 8/2025 | Crabtree | ................ | G06N 5/043 |
| 2025/0390352 A1* | 12/2025 | Crabtree | ............... | G06F 9/5027 |
| 2025/0390974 A1* | 12/2025 | Choi | ........................ | G06T 1/20 |
| 2026/0057309 A1* | 2/2026 | Galvin | ................... | G06N 20/00 |

* cited by examiner

| Operator | Mathematical Definition | GPU Kernel Implementation | Complexity |
|---|---|---|---|
| Diffusion Operator 202 | $D_t f = e^{-tL} f$ | - SpMV + Krylov approximation - diffuse$_{spmv}$ (L,f,t,k,s) | $O(k*nnz(L))$ Memory: $O(k(m+n))$ |
| Geodesic Operator 204 | $G(u,v) = \min_{\gamma:u \to v} \mathcal{L}(\gamma)$ | - Delta-stepping SSSP algorithm - sssp$\delta$elta$_{(A,w,S,s)}$ - Bucketed frontiers with light/heavy edges | $O(|E|+|V|\log W)$ W=weight spread |
| Spectral Operator 206 | $S_k f = \sum_{i=1}^{k} \langle f, \phi_i \rangle \phi_i$ | - Lanczos with selective reorthogonalization - lanczos$_{topk}$(L,k,e,s) -Mixed precision: TF32/FP32, FP64 | $O(km+k^2 n)$ with reorth. |
| Curvature Operator 208 | Forman: $k_F(e)$ Olivier-Ricci: $k(u,v) = 1 - \frac{W_1(k_u, k_v)}{d_M(u,v)}$ | - Forman: Edge-parallel reductions - Ollivier: Batched entropic OT (Sinkhorn) - sinkhorn$_{batch}$(C$_b$,e,T,I,s) | Forman: $O(m)$ Sinkhorn: $O(Bd^2 I)$ |
| Projection Operator 210 | $P(x) = arg\min_{v \in V} \|\phi(v) - x\|^2 + \lambda R(v)$ | Two-stage: ANN+least squares - Stage 1: GPU ANN - Stage 2: Batched projected CG/L-BFGS | $O(n^a)$, a<1+ $O(|C|^3)$ |
| Recombination Operator 212 | $R(y_1,y_2)$=geodesic interpolation($y_1$,$y_2$)+stochastic E | - Batched interpolation on embeddings - $z_a$=exp(a*log($z_2$/$z_1$))+E - Backproject via local SSSP | $O(B|y|)$ |
| Routing Operator 214 | $T(q) = arg\min_{Y \subseteq G} \sigma(Y,q)$ | - Three-stage: ANN to geodesic to scoring - ANN prefilter for candidates - k-radius geodesic expansion | $O(n^a + k|E'|)$ E' = local edges |

Receive event streams and communication streams
504

Batch inputs into structured ensemble
506

Generate embeddings
508

Project embeddings to graph vertices 510

Update dynamic property graph 512

Execute operator pipeline
514

Compute compression pressure 516

Prune low-curvature edges 520 ←yes— 518 —no→ Reinforce high-value paths 522

Extract cognitive trajectories
524

500

Sample action density from event and communication streams <u>802</u>

Compute exponentially weighted moving average <u>804</u>

Calculate replay frequency <u>806</u>

Determine stabilization time <u>808</u>

<u>810</u> yes

Update stream priorities <u>812</u> no

Maintain stream priorities <u>814</u>

Trigger CUDA graph pipeline <u>816</u>

Monitor performance metrics <u>818</u>

<u>820</u> yes

Adjust parameters <u>822</u> no

Continue with current parameters <u>824</u>

FIG. 8

800

EXECUTING SELF-EVOLVING PROPERTY GRAPHS ON GPU HARDWARE

CROSS-REFERENCE TO RELATED APPLICATIONS

Priority is claimed in the application data sheet to the following patents or patent applications, each of which is expressly incorporated herein by reference in its entirety:

63/875,311

BACKGROUND OF THE INVENTION

Field of the Art

The present invention is in the field of computer-implemented cognitive architectures for processing experiential data streams, and more particularly to GPU-accelerated graph-based systems that achieve logarithmic memory scaling through geometric transformations of dynamic property graphs for real-time decision support and pattern recognition applications.

Discussion of the State of the Art

Modern artificial intelligence and cognitive computing systems face fundamental scaling limitations when processing continuous streams of experiential data. Neural network architectures, including large language models (LLMs) and deep learning systems, require extensive training phases followed by static inference, with memory requirements growing linearly or super-linearly with model capacity. These systems cannot continuously incorporate new experiences without periodic retraining, and their monolithic weight matrices provide no mechanism for selective memory management or structural adaptation during operation.

Multi-agent systems (MAS) represent an alternative approach where distributed agents coordinate through message passing to achieve collective intelligence. However, MAS architectures suffer from quadratic scaling of communication overhead as the number of agents increases. Each agent must potentially communicate with every other agent, resulting in $O(N^2)$ message complexity that renders these systems computationally intractable beyond modest scales. Furthermore, the lack of shared representation across agents leads to redundant processing and inconsistent world models that diverge over time.

Graph neural networks (GNNs) have emerged as a method for processing structured data by propagating information through graph topologies. While GNNs can handle dynamic graphs to some extent, they remain fundamentally tied to the training-inference paradigm of neural networks. The learned parameters are static between training sessions, and the architectures lack mechanisms for continuous structural evolution. Memory usage in GNNs typically scales linearly with the number of nodes and edges, providing no compression benefits as experiential data accumulates.

Symbolic AI systems maintain explicit knowledge representations using logic-based formalisms, production rules, or semantic networks. These systems can reason about their knowledge and update their rule bases, but suffer from brittleness when confronted with continuous, noisy, real-world data streams. The manual engineering of rules and ontologies cannot keep pace with the complexity and variability of experiential input, and the discrete nature of symbolic representations prevents smooth adaptation and generalization.

Existing GPU-accelerated graph processing frameworks focus on static graph analytics or batch updates rather than continuous evolution. Systems like NVIDIA's cuGraph and GraphBLAS provide efficient primitives for graph algorithms but lack the self-executing characteristics needed for autonomous cognitive processing. These frameworks require external orchestration and cannot adapt their execution patterns based on data characteristics or system load.

Current approaches to memory management in continuous learning systems rely on either forgetting mechanisms that discard old information or replay buffers that store raw experiences. Forgetting leads to catastrophic loss of previously learned patterns, while replay buffers exhibit linear memory growth that becomes unsustainable for long-running systems. No existing architecture provides principled compression that preserves essential structure while bounding memory growth.

What is needed is a cognitive architecture that combines the parallel processing capabilities of GPUs with a graph-based representation that can evolve continuously without external orchestration, support logarithmic rather than linear memory scaling through principled compression mechanisms, transform communication overhead from a burden into a driver of system coherence, and maintain consistent performance across scales from hundreds to millions of experiential inputs while preserving the ability to extract meaningful patterns and generate adaptive responses in real-time.

SUMMARY OF THE INVENTION

Accordingly, the inventor has conceived and reduced to practice, a system and method for executing self-evolving property graphs on GPU hardware for unbounded experiential processing. The system stores a dynamic property graph comprising event and communication vertices in GPU memory. Input streams are projected to graph vertices through specialized operators. Multiple GPU-executable operator kernels transform the graph through geometric operations including diffusion, geodesic computation, and curvature analysis. These operators are captured as a directed acyclic graph that executes repeatedly without external scheduling, with execution frequency adjusted based on a logarithmic relationship with input stream density. A compression mechanism identifies and removes redundant graph elements based on geometric properties, maintaining memory growth proportional to the logarithm of processed inputs. The system enables continuous transformation of experiential inputs into cognitive trajectories while avoiding the linear or quadratic memory scaling that limits conventional architectures. Applications include real-time decision support, pattern recognition, and autonomous system control.

According to a preferred embodiment, a computer-implemented system for executing self-evolving property graphs is disclosed, comprising: one or more graphics processing units storing a dynamic property graph comprising vertices, edges, and associated properties, wherein the vertices comprise event vertices representing experiential inputs and communication vertices representing information exchanges; a projection operator configured to receive input streams and map the streams to vertices in the dynamic property graph; a plurality of operator kernels executable on the graphics processing units, the operator kernels configured to transform the dynamic property graph through geometric operations including information diffusion, path computation, and curvature analysis; a graph execution controller configured to capture the operator kernels as a directed acyclic graph and repeatedly execute the directed acyclic graph to continuously update the dynamic property graph without external scheduling intervention; an action density sampler configured to measure input stream density and provide density measurements to the graph execution controller, wherein the controller adjusts execution frequency based on a logarithmic relationship with the measured density; and a compression mechanism configured to identify and remove redundant graph elements based on geometric properties to maintain logarithmic memory growth with respect to cumulative input volume; wherein continuous execution of the operator kernels transforms the input streams into trajectories through the dynamic property graph while maintaining bounded memory requirements.

According to another preferred embodiment, a computer-implemented method for executing self-evolving property graphs is disclosed, comprising the steps of: storing a dynamic property graph in one or more graphics processing units, the dynamic property graph comprising vertices, edges, and associated properties, wherein the vertices comprise event vertices representing experiential inputs and communication vertices representing information exchanges; receiving input streams and mapping the streams to vertices in the dynamic property graph using a projection operator; transforming the dynamic property graph by executing a plurality of operator kernels on the graphics processing units, the operator kernels performing geometric operations including information diffusion, path computation, and curvature analysis; capturing the operator kernels as a directed acyclic graph and repeatedly executing the directed acyclic graph to continuously update the dynamic property graph without external scheduling intervention; measuring input stream density and adjusting execution frequency of the directed acyclic graph based on a logarithmic relationship with the measured density; and identifying and removing redundant graph elements based on geometric properties to maintain logarithmic memory growth with respect to cumulative input volume; wherein continuous execution of the operator kernels transforms the input streams into trajectories through the dynamic property graph while maintaining bounded memory requirements.

According to an aspect of an embodiment, the operator kernels comprise: a diffusion operator configured to propagate information along graph edges; a geodesic operator configured to compute shortest paths between vertices; a spectral operator configured to extract global structure through eigendecomposition; a curvature operator configured to quantify local redundancy; and a recombination operator configured to generate novel trajectories through interpolation.

According to an aspect of an embodiment, the compression mechanism removes edges having curvature values below a dynamically adjusted threshold, and wherein the threshold is adjusted to maintain memory usage within a target bound proportional to the logarithm of processed input volume.

According to an aspect of an embodiment, the system further comprises a hierarchical manifold structure comprising a fast manifold for processing events, a mesoscale manifold for decision trajectories, and a foundational manifold for long-term patterns; and bidirectional mappings between manifold layers configured to propagate abstractions upward and constraints downward.

According to an aspect of an embodiment, the bidirectional mappings compute a cognitive residual measuring divergence between upward abstractions and downward constraints, and wherein the foundational manifold is updated to minimize said cognitive residual.

According to an aspect of an embodiment, the graph execution controller comprises a CUDA Graph implementation that captures the operator kernels for repeated execution with modified parameters between executions.

According to an aspect of an embodiment, the projection operator employs a two-stage process comprising approximate nearest neighbor search followed by regularized assignment to determine vertex placement for new inputs.

According to an aspect of an embodiment, the dynamic property graph is stored using a hybrid representation comprising Compressed Sparse Row format for efficient traversal and Coordinate format journals for dynamic updates According to an aspect of an embodiment, the logarithmic relationship between execution frequency and input stream density prevents runaway acceleration while ensuring higher experiential density produces faster stabilization of the property graph structure.

BRIEF DESCRIPTION OF THE DRAWING FIGURES

FIG. 2 illustrates an exemplary operator-to-kernel mapping table showing the correspondence between theoretical geometric operators and their GPU kernel implementations, according to an embodiment.

FIG. 8 is a flow diagram illustrating an exemplary method for adaptive pipeline scheduling that enables the Manifold Engine to self-regulate its execution frequency based on experiential density and system performance, according to an embodiment.

DETAILED DESCRIPTION OF THE INVENTION

Figure 1:
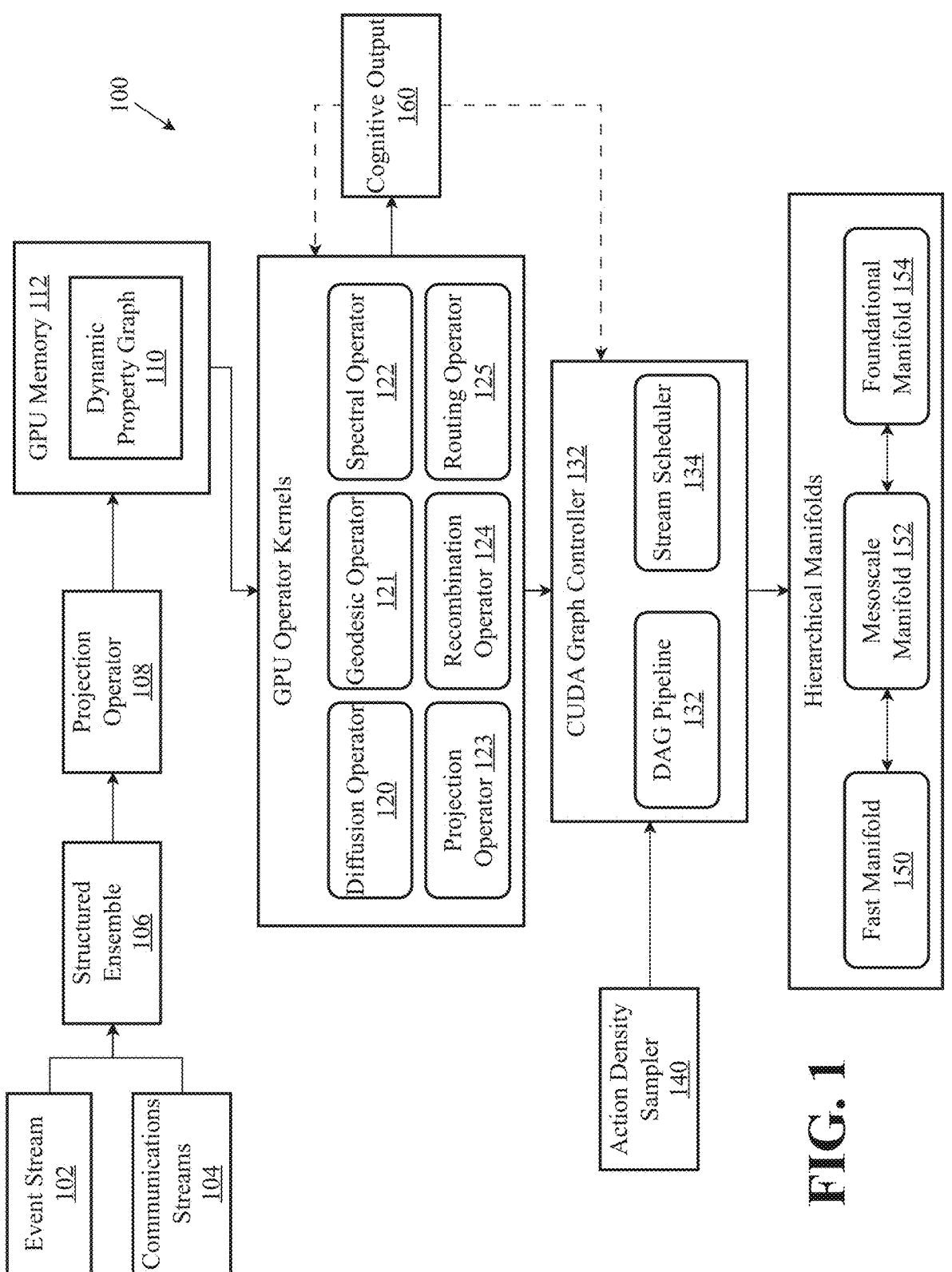
FIG. 1 is a block diagram illustrating an exemplary system architecture of a manifold engine for executing a self-evolving property graph on GPU, according to an embodiment.

The inventor has conceived, and reduced to practice, a system and method for executing self-evolving property graphs on GPU hardware for unbounded experiential processing. The system stores a dynamic property graph comprising event and communication vertices in GPU memory. Input streams are projected to graph vertices through specialized operators. Multiple GPU-executable operator kernels transform the graph through geometric operations including diffusion, geodesic computation, and curvature analysis. These operators are captured as a directed acyclic graph that executes repeatedly without external scheduling, with execution frequency adjusted based on a logarithmic relationship with input stream density. A compression mechanism identifies and removes redundant graph elements based on geometric properties, maintaining memory growth proportional to the logarithm of processed inputs. The system enables continuous transformation of experiential inputs into cognitive trajectories while avoiding the linear or quadratic memory scaling that limits conventional architectures. Applications include real-time decision support, pattern recognition, and autonomous system control.

The present invention provides a computational system, referred to herein as the Manifold Engine, that realizes cognitive processes through continuous execution of operators on a structured graph representation of experiential flows. Unlike conventional neural network architectures that alternate between training and inference phases or symbolic manipulation systems that operate on discrete rules, the Manifold Engine treats cognition as the continuous evolution of a weighted property graph whose geometric properties encode experiential structure. In this framework, a cognitive manifold is represented discretely as a property graph comprising nodes that encode events and communications, with operators that approximate the continuous geometry of cognitive processes.

According to various embodiments, the Manifold Engine employs a dynamic property graph $G=(V, E, A)$ as its fundamental data structure. The vertex set $V$ can be partitioned into two disjoint subsets: event vertices $V_e$ representing (but not limited to) sensor observations, user actions, or environmental occurrences, and communication vertices $V_c$ representing (but not limited to) dialog, rationale, or coordination signals. The edge set $E \subseteq V \times V$ comprises directed edges that encode relations, temporal ordering, or causal couplings between vertices. A property assignment function $A: V \cup E \to R^k$ maps both vertices and edges to k-dimensional property vectors, which may include, but are not limited to, embeddings, timestamps, weights, and domain-specific metadata. Each cognitive manifold $M$ is realized as a geometric proxy of the graph $G$, wherein a distance function $d_M$ is derived from weighted path lengths through the graph, and local curvature is derived from flow divergence or optimal transport computations over vertex neighborhoods. This dual nature of $G$ as both a storage structure and an executable object enables its topology to evolve with experiential input while operators instantiate manifold dynamics thereon.

An experiential trajectory within the Manifold Engine can be defined as a sequence of vertices $\gamma=(v_0, v_1, \ldots, v_T)$, where each $v_t \in V$, such that consecutive vertices are connected by edges $(v_t, v_{t+1}) \in E$ and their associated timestamps satisfy the temporal ordering constraint $\tau(v_t) < \tau(v_{-+1})$. Each such trajectory induces a corresponding path in the cognitive manifold through a projection mapping $\pi: \gamma \to \pi(\gamma) \subset M$, with the path length defined as:

$$L(\gamma) = \sum_{t=0}^{T-1} d_M(v_t, v_{t+1})$$

where $d_M$ represents the manifold distance metric. The persistence, reuse, and recombination of these trajectories serve as discrete computational correlates of geodesic motion and manifold condensation processes in the continuous geometric formulation.

In various embodiments, the Manifold Engine implements cognitive processes through an operator algebra $O$ acting on functions $f: V \to R^d$ defined over the graph vertices. The system employs a plurality of fundamental operators that realize the canonical geometric functionals. The diffusion operator $D_t$, $f = e^{-tL} f$, where $L = D - A$ is the graph Laplacian with $D$ being the degree matrix and $A$ the adjacency matrix, propagates information along graph edges and approximates the heat kernel $e^{-t\Delta}$ on the continuous manifold. The geodesic operator:

$$G(u, v) = \min_{\gamma: u \to v} L(\gamma)$$

computes minimal path lengths between vertices $u$ and $v$, implemented on GPUs through multi-source shortest path kernels to approximate geodesic distances in $M$. The spectral operator:

$$S_k f = \sum_{i=1}^{k} \langle f, \phi_i \rangle \phi_i$$

projects function $f$ onto the first $k$ eigenmodes of the Laplacian, where $$\langle (\lambda_i, \phi_i) \rangle_{i=1}^k$$

are the eigenpairs, revealing global structure and supporting manifold condensation. The curvature operator computes Ollivier-Ricci curvature:

$$k(u, v) = 1 - \frac{W_1(\mu_u, \mu_v)}{d_M(u, v)}$$

for edge $e=(u,v)$, where $W_1$ is the 1-Wasserstein distance between local probability measures $\mu_u$ and $\mu_v$, quantifying compression pressure and driving pruning or reinforcement decisions. The projection operator:

$$P(x) = \operatorname{argmin}_{v \in V} \|\phi(v) - x\|^2$$
$$+ \lambda R(v)$$

maps external embeddings $x \in R^m$ into the manifold, where $\phi(v)$ is the vertex embedding and $R(v)$ encodes structural regularization. The recombination operator $R(\gamma_1, \gamma_2)$ generates new trajectory candidates through geodesic interpolation of existing trajectories $\gamma_1$ and $\gamma_2$, with coherence evaluated by a fitness functional $F[\gamma]$. This operator implements dreaming and abstraction by the manifold engine. The routing operator:

$$T(q) = \underset{\gamma \subseteq G}{\mathrm{argmin}}\, \sigma(\gamma, q)$$

identifies optimal trajectories (e.g., trajectory candidate) for a given query q, where $\sigma$ is a relevance score combining one or more of proximity, novelty, recency, and trust metrics. Other metrics may be used in various embodiments of the system and methods described herein.

The Manifold Engine enables autonomous operation through self-executing graphs, wherein operator pipelines can be captured as directed acyclic graphs (DAGs) of GPU kernels: $\Pi=(O_1 \to O_2 \to \ldots \to O_n)$. These pipelines are executed repeatedly over the evolving graph G without external scheduling intervention. Each pipeline corresponds to a canonical cognitive loop, such as, for example, the sequence projection$\to$diffusion$\to$curvature$\to$recombination, implementing specific aspects of manifold evolution. Once captured, these pipelines can be replayed continuously through hardware-accelerated execution mechanisms, defining self-executing graphs as data structures whose dynamics are intrinsic rather than externally scheduled. This architecture enables the system to maintain continuous cognitive processes without the discrete phase transitions characteristic of traditional machine learning systems.

The Manifold Engine architecture translates abstract geometric functionals into executable computational algebra through the integration of a property graph schema, trajectory formalism, and operator calculus. In operation, events and communications enter the system as streams, undergo projection into the graph structure G, and evolve under the continuous application of operators O. This creates a living computational substrate wherein the cognitive manifold's structure and dynamics are sustained by self-executing pipelines, providing a concrete realization of geometric cognition on parallel computing hardware.

The system and methods disclosed herein provide specific computational implementations of geometric functionals through a systematic mapping of canonical cognitive principles to executable GPU operators. Each operator in the Manifold Engine corresponds to a fundamental geometric operation that enables cognition to emerge from the continuous evolution of the property graph structure. The following paragraphs describe how abstract mathematical functionals can be realized as concrete computational kernels executing on parallel hardware architectures.

In various embodiments, the Manifold Engine implements the principle of attention as geodesic motion through multi-source shortest path computations on the property graph. In accordance with the canonical formulation wherein attention minimizes a cognitive action functional, the system computes:

$$G(u, v) = \underset{\gamma:u \to v}{\min} L(\gamma)$$

where $\gamma$ represents an experiential trajectory connecting vertices u and v, and $L(\gamma)$ denotes the trajectory length under the induced metric. This computation can realized through parallel single-source shortest path (SSSP) kernels executing on GPU hardware, enabling real-time evaluation of candidate trajectories formed by sequences of events and communications. The geodesic operator thereby provides a computationally efficient mechanism for determining optimal paths through the experiential manifold, with the minimal path length serving as a measure of cognitive distance between states.

The system implements compression pressure, which quantifies redundancy and drives manifold condensation, through curvature operators acting on the graph structure. The Manifold Engine can be configured to employ two complementary curvature computations: Forman curvature and Ollivier-Ricci curvature. The Forman curvature provides computationally efficient local estimates according to the formula:

$$K_F(e) = 1 - \frac{1}{2}\left(\frac{w(u)}{w(e)} + \frac{w(v)}{w(e)}\right) + \sum_{f \supset e} \frac{w(e)}{\sqrt{w(e)w(f)}}$$

where e=(u,v) is an edge, w denotes weights, and the summation extends over edges f sharing a vertex with e. The Ollivier-Ricci curvature refines alignment measurements through optimal transport computations where the 1-Wasserstein distance between probability measures $\mu_u$ and $\mu_v$ supported on vertex neighborhoods. These curvature fields generate compression pressure $P(z)=\|\nabla \cdot \vec{v}(z)\|$, which the engine utilizes to make pruning decisions, merge redundant structures, and reinforce significant experiential trajectories.

The Manifold Engine realizes spectral geometry operations through eigendecomposition of the graph Laplacian, providing mechanisms for dimensional reduction and structure stabilization. The spectral operator projects functions f onto the subspace spanned by the first k eigenvectors $\{\varphi_i\}$ of the Laplacian operator, where the eigenvectors correspond to the k smallest eigenvalues. These spectral projections yield low-dimensional coordinate representations for events and communications, enabling efficient condensation of trajectories into macro-structures while preserving essential geometric relationships. The spectral decomposition further supports cross-manifold alignment in hierarchical architectures by providing a common basis for comparing structures across different temporal scales.

The system implements metabolic dynamics through recombination operators that generate novel experiential trajectories by interpolating between existing paths. Given two trajectories $\gamma_1$ and $\gamma_2$, the recombination operator computes interpolants according to:

$$R(\gamma_1,\gamma_2)=\exp_{\gamma_1(0)}(\alpha \log_{\gamma_1(0)}(\gamma_2(0))+\varepsilon)$$

where $\alpha \in [0,1]$ controls the interpolation parameter, exp and log denote exponential and logarithm maps in the manifold, and $\varepsilon$ represents stochastic perturbation sampled from a controlled distribution. In some aspects, the system may evaluate candidate interpolants using a coherence functional $F[\gamma]$ that measures trajectory fitness based on local consistency, global alignment, and information content. Trajectories satisfying $F[\gamma]>F_{threshold}$ are retained in the graph structure, while others are discarded, thereby implementing a generative process that explores the space of possible experiences while maintaining structural coherence.

The Manifold Engine implements the principle that communications constitute geometric actions by transforming communication signals into modifications of the manifold's connection structure. When a communication $c_{ij}(t)$ between processes i and j is received, the system updates connection coefficients according to $\Gamma^k_{ij}=\Gamma^k_{ij}+f(c_{ij}(t))$, where $\Gamma^k_{ij}$ are the connection coefficients defining parallel transport on the manifold, and f is a mapping function that translates communication content into geometric perturbations. This mechanism enables communications to braid trajectories across different roles or processes, creating coupling between otherwise independent experiential flows. The communication density:

$$\rho_g = \frac{1}{T}\int_0^T \lambda_e \left| E_{events}(t) \right| + \lambda_c \left| E_{comm}(t) \right| dt$$

where $\lambda_e$ and $\lambda_c$ are weighting parameters, governs operator scheduling with condensation time satisfying $\tau_c \sim 1/\log(1+\rho_g)$, thereby establishing communications as drivers rather than overhead in the cognitive process.

The system implements hierarchical cognitive structures through explicit submersion and immersion operators that couple manifolds operating at different temporal scales. The Manifold Engine enables upward abstraction through Riemannian submersion mappings $\varphi_{12}: M_1 \to M_2$ and $\varphi_{23}: M_2 \to M_3$, which preserve geodesic structure while reducing dimensionality, enabling event sequences to be abstracted into decision trajectories and ultimately into identity structures. Downward constraint injection can be implemented through Riemannian immersion mappings $\psi_{32}: M_3 \to M2$ and $\psi_{21}: M_2 \to M_1$, which restrict the configuration spaces of lower manifolds based on higher-level policies and values. The system quantifies consistency between abstraction and constraint paths through residual functionals $C(p)=d_{M3}(u(p), d(p))$, where $u(p)=(\varphi_{23}°\varphi_{12})(p)$ represents the upward abstraction path and $d(p)=(\psi_{32}^{-1}°\psi_{21}^{-1})(p)$ represents the downward constraint path. Gradient descent on the foundational manifold according to $dr/dt=-\nabla_{M3}C(r)$ implements metacognitive correction, adjusting high-level constraints to minimize divergence.

The Manifold Engine supports distributed cognitive systems through federation mechanisms that enable multiple engine instances to maintain coherence while preserving local autonomy. The system can be configured to quantify alignment between federated instances using three divergence measures: metric divergence $$D_{metric}(M_2^A, M_2^B) = \inf_{f \in Diff(M_2)} \int_{M_2} \left\| g_2^A - f * g_2^B \right\|^2 d\mu$$

which measures differences in manifold geometry; spectral divergence $$D_{spectral}(M_3^A, M_2^B) = \sum_{k=1}^{\infty} \alpha_k \left| \lambda_k^A - \lambda_k^B \right|$$

which compares eigenvalue spectra with exponentially decaying weights $\alpha_k$; and foundational divergence $$D_{found}(M_3^A, M_3^B) = d_{M_3}(r^A, r^B)$$

which measures distances between identity structures. Each engine can be configured to maintain autonomy envelopes $\varepsilon_i=(\varepsilon_{i,1}, \varepsilon_{i,2}, \varepsilon_{i,3})$ specifying maximum tolerable divergences at each hierarchical level. Exceeding thresholds may trigger corrective actions including, but not limited to, resynchronization, rollback, or human arbitration. The system implements federated residual minimization to maintain global coherence while respecting local autonomy constraints, enabling scalable deployment across distributed cognitive grids.

Through the systematic mapping of canonical geometric functionals to executable GPU operators, the Manifold Engine provides a complete computational realization of geometric cognition. Each functional-geodesic motion for attention, compression pressure through curvature, spectral condensation for structure extraction, recombination for generative exploration, communication-induced geometry for coordination, hierarchical coupling for multi-scale reasoning, and federation for distributed deployment-corresponds to specific operator implementations on property graphs. This comprehensive operator suite enables the transformation of abstract geometric theory into practical, scalable computation on modern parallel hardware architectures.

The system and methods described herein enable fundamental scaling advantages through mathematical properties that emerge naturally from the execution of geometric operators rather than being imposed through external design constraints. Unlike conventional architectures where scaling represents a peripheral engineering concern, the Manifold Engine exhibits scaling laws as inherent consequences of its operator algebra, ensuring that cognitive capabilities improve rather than degrade with increasing experiential volume. These emergent scaling properties distinguish the present system from both large language models (LLMs) that require exponential cost increases and multi-agent systems that suffer quadratic coordination overhead.

The Manifold Engine achieves logarithmic memory growth through the natural redundancy compression inherent in its geometric operators. As the system processes n cumulative experiential inputs comprising events and communications projected into the engine, each input perturbs the cognitive manifold while redundant trajectories undergo collapse under compression pressure. The probability that a new input represents genuinely novel information decreases according to $Pr(novel\ at\ step\ n)\sim 1/n$, reflecting the increasing likelihood that new experiences resemble previously encountered patterns. Consequently, the marginal contribution to manifold size satisfies the differential relationship $dM/dn\sim 1/n$, where M represents the effective memory size. Integration of this relationship yields the logarithmic scaling law $M(n)\sim \log n$, where effective memory may be measured through various metrics including manifold dimension, topological complexity, or information-theoretic entropy. This logarithmic bound on memory growth persists even as experiential volume increases without limit, providing a fundamental solution to the memory scaling problem that plagues conventional cognitive architectures.

The system exhibits an intrinsic stabilization time constant that accelerates rather than degrades with increasing experiential density. When inputs arrive at an external action density $\rho_a^{ext}$, the effective manifold size at that density follows $M(\rho_a^{ext})\sim \log(1+\rho_a^{ext})$. The characteristic stabilization time of the manifold, representing the time required for the system to achieve coherent structure after perturbation, is given by $\tau_c \sim 1/M(\rho_a^{ext})\sim 1/\log(1+\rho_a^{ext})$. This inverse logarithmic relationship establishes $\tau_c$ as a cognitive relaxation constant with the remarkable property that higher experiential density produces faster stabilization rather than slower convergence. This behavior inverts the typical scaling relationship observed in multi-agent systems, where increased communication density induces computational collapse, instead achieving enhanced coherence through increased experiential flow.

The Manifold Engine maintains cognitive vitality through a metabolic law governing internal dynamics that prevents stagnation and enables continuous learning. While external input provides new experiential data, cognition requires continual internal motion to maintain adaptability and generate novel insights. The system maintains an internal action density pal representing the rate of endogenous activities including trajectory replay, recombination operations, and stochastic perturbations. Cognitive persistence demands satisfaction of a metabolic floor constraint: $\rho_a^{int} \geq \rho_a^{min}$, where $\rho_a^{min}$ represents the minimum action density required to sustain cognitive processes. When $\rho_a^{int} < \rho_a^{min}$, the velocity field $\vec{v}$ on the manifold vanishes, causing compression pressure $P(z) = \|\nabla \cdot \vec{v}(z)\|$ to decay to zero and resulting in manifold collapse into static configurations. Sustained internal dynamics above the metabolic floor maintain positive compression pressure, ensuring continuous pruning of redundant structures, reinforcement of useful patterns, and exploration of novel recombinations. This metabolic requirement establishes cognition not merely as a passive response to external stimuli but as an active process requiring continual endogenous action.

The operator calculus of the Manifold Engine predicts and exhibits distinct phase transitions at critical densities of events and communications, marking qualitative shifts in cognitive behavior. The system undergoes phase transitions at the following critical density thresholds:

$$\rho_{fast}^{crit}$$

marks the transition from noise to coherent flows on fast manifolds, where random events coalesce into meaningful trajectories;

$$\rho_{meso,1}^{crit}$$

indicates the transition from static configurations to tactical coherence on mesoscale manifolds, enabling coordinated decision-making;

$$\rho_{meso,2}^{crit}$$

represents the transition from mere coherence to generative imagination, where the system begins producing novel trajectories through recombination; and $$\rho_{slow}^{crit}$$

marks the transition from episodic memory to doctrinal attractors on slow manifolds, establishing stable identity structures. The hierarchical coupling through fiber connections between manifolds reduces these critical thresholds, producing cascading stabilization effects across scales. For example, dense event flows on the fast manifold lower the threshold for mesoscale coherence, which in turn accelerates schema consolidation on the slow manifold, creating a synergistic acceleration of cognitive development.

The execution properties of the Manifold Engine yield a constructive, operationally verifiable definition of cognition based on measurable system behaviors rather than abstract philosophical criteria. According to this definition, a system exhibits cognition if it sustains, reuses, and recombines experiential trajectories across episodes while maintaining logarithmic memory growth, possessing an intrinsic stabilization constant, sustaining continual metabolic action, and undergoing phase transitions into coherent regimes. Formally, let $\Gamma(t)$ denote the set of active trajectories at time t, and $F[\gamma]$ represent a fitness functional measuring trajectory coherence and reuse potential. The system's cognitive capacity is quantified by the functional:

$$C(t) = \int_{\Gamma(t)} F[\gamma] d\mu(\gamma)$$

where $\mu$ is an appropriate measure over trajectory space. A system is deemed cognitive if it satisfies the persistence criterion:

$$\lim_{T \to \infty} \inf \frac{1}{T} \int_0^T C(t) dt > 0$$

indicating sustained positive cognitive capacity over infinite time horizons. The Manifold Engine satisfies this condition structurally through its operators, which enforce logarithmic memory scaling, maintain nonzero compression pressure through metabolic dynamics, and enable continual trajectory recombination, making cognition an inevitable outcome of system execution rather than an emergent accident.

The scaling laws exhibited by the Manifold Engine represent fundamental mathematical properties of the operator algebra rather than engineering optimizations or heuristic design choices. Through the natural dynamics of geometric operators, the system ensures logarithmic memory growth independent of experiential volume, acceleration of stabilization with increased input density, sustained cognitive vitality through metabolic action requirements, and structured phase transitions marking cognitive development milestones. These properties collectively establish that cognition in the Manifold Engine is not a fragile computational artifact requiring careful tuning but rather the mathematically inevitable outcome of executing the specified operator algebra, providing a robust foundation for scalable cognitive systems.

The system and methods disclosed herein provide a comprehensive GPU implementation architecture that realizes the Manifold Engine's theoretical operators as high-performance computational kernels executing on modern (and future) graphics processing hardware. An implementation specifies data structures optimized for parallel access patterns, kernel interfaces with defined complexity bounds, orchestration mechanisms utilizing CUDA Graphs and Streams, multi-GPU scaling through sharding and collective operations, persistent storage with crash consistency guarantees, and numerical stability policies ensuring reproducible execution. The following detailed specification enables the geometric operators described herein to execute with predictable performance characteristics on commercially available GPU platforms.

The GPU implementation employs specialized data structures optimized for coalesced memory access and minimal storage overhead. The dynamic property graph G=(V, E, A)

can be maintained in GPU memory using a hybrid storage scheme comprising three primary components. First, adjacency information utilizes Compressed Sparse Row (CSR) format for the working graph, with $\text{row}_{ptr} \in \mathbb{N}^{|V|+1}$, $\text{col}_{ind} \in \mathbb{N}^{|E|}$, and weights $w \in \mathbb{R}^{|E|}$ alongside Coordinate (COO) format for incremental updates stored in journals. Second, vertex and edge properties employ Structure-of-Arrays (SoA) layout to maximize memory coalescing: $\Phi_V = \{\varphi^{(1)}, \ldots, \varphi^{(d)}\} \in \mathbb{R}^{d \times |V|}$ for vertex properties and $\Phi E = \{\psi^{(1)}, \ldots, \psi^{(r)}\} \in \mathbb{R}^{r \times |E|}$ for edge properties. Third, the system can be configured to maintain append-only journals as GPU-resident ring buffers storing edge and vertex deltas in the format (u, v, w, meta), with periodic compaction operations rebuilding the CSR representation from accumulated COO entries to amortize dynamic update costs. Memory allocation may utilize pooled allocators to prevent fragmentation, with pinned host buffers facilitating ingress/egress operations. The system explicitly avoids Unified Virtual Memory on performance-critical paths to ensure data locality and predictable latency. A hot/cold tiling scheme partitions vertices into frequently accessed hot tiles pinned to device memory and cold tiles accessed via GPUDirect Storage when necessary.

The system implements each theoretical operator as one or more GPU kernels with well-defined interfaces and complexity characteristics. The operator-to-kernel mapping provides the following implementations: Diffusion/Heat Kernel, Geodesic (Multi-Source SSSP), Spectral (Top-k Eigenpairs), Curvature (Compression Pressure), Projection (External→Manifold), Recombination (Dreaming), and Routing (Query→Trajectory).

The diffusion operator $D_t f = e^{-tL} f$, where $L = D - A$ represents the graph Laplacian, is implemented through iterative sparse matrix-vector (SpMV) operations combined with Krylov subspace approximation. The kernel interface diffuse$_{spmv}$(L, f, t, k, s) constructs the Krylov subspace $K_k(f) = \text{span}\{f, Lf, \ldots, L^{k-1}f\}$, solves the reduced system, and updates $f \leftarrow e^{-tL} f$ through projection, where s denotes the CUDA stream handle.

The geodesic operator $$G(S) = \min_{\gamma: u \in S \to v} L(\gamma)$$

employs a Δ-stepping algorithm with bucketed frontiers for parallel execution. The kernel sssp$_{delta}$(A, w, S, s) initializes distances $d[v] = \infty$ for all vertices except source vertices where $d[u] = 0$ for $u \in S$, then iteratively relaxes edges using light/heavy edge classification within buckets implemented as device-side queues. Relaxation operations utilize warp-aggregated atomic operations to reduce memory contention. The algorithm exhibits $O(|E| + |V| \log W)$ expected complexity, where W represents the weight spread, with latency hiding achieved through concurrent bucket processing on independent streams.

The spectral operator computing $L\varphi_i = \lambda i * \varphi_i$ for $i = 1 \ldots k$ employs a Lanczos algorithm with selective reorthogonalization and mixed-precision arithmetic. The kernel lanczos$_{topk}$(L, k, ε, s) implements block-Lanczos iteration on the CSR-formatted Laplacian L, performs selective Gram-Schmidt orthogonalization, and extracts eigenpairs through Rayleigh-Ritz procedures with error-controlled restarts. The implementation utilizes TF32/FP32 for accumulation operations and FP64 for critical correction steps, maintaining residual bounds $\|L\varphi_i - \lambda_i * \varphi_i\|_2 \le \varepsilon$. Warm-start capabilities reuse previous Ritz pairs after incremental graph updates, with low-rank update formulas avoiding full recomputation.

The system implements two curvature measures with different computational trade-offs. Forman curvature executes as an edge-parallel kernel performing reductions over two-hop stencils with coalesced reads via CSR row slicing. Ollivier-Ricci curvature employs batched entropic optimal transport solved through Sinkhorn iteration. The kernel sinkhorn$_{batch}$($\{C_b\}$, ε, τ, I, s) processes batches b of cost matrices $C_b$ representing pairwise distances on neighborhoods $N_k(u)$, $N_k(v)$, iterating $K = \exp(-C_b/\varepsilon)$, $u \leftarrow a/(Kv)$, $v \leftarrow b/(K^T u)$ for I iterations or until residual $\|r\| < \tau$. The entropic approximation $W_1^\varepsilon$ introduces bias $O(\varepsilon)$ but enables efficient parallel computation.

The projection operator:

$$P(x) = \underset{v \in V}{\arg\min} \|\phi(v) - x^2\| + \lambda R(v)$$

employs a two-stage approach for efficiency. Stage one utilizes GPU-accelerated approximate nearest neighbor (ANN) search, implementing either IVF-PQ or graph-based ANN to identify a candidate set C. Stage two solves a small batched least-squares problem:

$$\min_{a \ge 0, 1^T \alpha = 1} \|X_C \alpha - x\|_2^2 + \lambda \alpha^T \Omega \alpha$$

over the candidate set using batched projected conjugate gradient or L-BFGS optimization.

The recombination operator generates geodesic interpolants $z_\alpha = \exp_{z_1}(\alpha \log_{z_1}(_{z_2})) + \xi$, where $\alpha \varepsilon [0,1]$ and $\xi \sim N(0, \Sigma)$ represents stochastic perturbation. The kernel performs batched interpolation on embedded coordinates followed by backprojection to feasible paths via local SSSP computation. Fitness evaluation $F[\gamma]$ employs parallel reductions, with high-fitness survivors appended to the graph journals for integration.

The routing operator $$T(q) = \underset{\gamma}{\arg\max} \, \sigma(\gamma, q)$$

combines multiple stages: ANN prefiltering identifies initial candidates, k-radius geodesic expansion explores local neighborhoods, and top-K selection applies a fused scoring kernel computing $\sigma$ as a weighted combination of proximity, novelty, recency, and trust metrics. Scatter-gather patterns minimize DRAM round-trips during the scoring phase.

The system enables efficient execution through sophisticated orchestration of GPU resources. Operator DAGS $\Pi = (O1 \to \ldots \to O_n)$ can be captured as CUDA Graphs, amortizing kernel launch overhead and enabling single-submission execution of complex pipelines. Parameters such as diffusion time t, eigenvector count k, and convergence tolerance & can be updated between graph replays without recapture overhead. Distinct cognitive pipelines, including ingest, diffusion, curvature computation, spectral refresh, and recombination, execute on separate CUDA streams with explicit event-based dependencies. Stream priorities ensure latency-sensitive operations such as query routing preempt background computations like spectral updates. Where register pressure permits, the system fuses micro-kernels (e.g., SpMV followed by reduction) to increase arithmetic intensity and reduce global memory traffic. The scheduler samples action density $\rho_g$ and dynamically adjusts replay frequencies: increasing diffusion rate under high event density while deferring spectral updates when $\rho_g$ is low, yielding an adaptive, density-controlled compute budget.

The implementation scales across multiple GPUs through graph partitioning and collective communication primitives. The vertex set Vis partitioned into $$V = \bigsqcup_{p=1}^{p} V_p$$

using graph partitioning algorithms that minimize edge cuts while balancing computational load. Each GPU shard maintains $CSR(V_p)$ for its local vertices and border caches for halo neighbors required in computations. Journals are maintained per-shard with epoch counters ensuring consistency. Frontier exchanges during SSSP computation and reductions for spectral residuals and curvature statistics utilize NCCL collective operations including all-reduce and all-gather primitives. The system overlaps communication with computation through double-buffered halo exchanges. Load imbalance triggers dynamic vertex migration, with the system selecting boundary tiles to reduce cut ratios and equalize both nonzero counts and frontier sizes. Migrations are batched at compaction points to preserve execution determinism.

The system implements high-bandwidth I/O paths with persistence guarantees. Events and communications arrive as batched records in pinned host buffers, with GPUDirect Storage streaming batches directly to device journals without host memory copies. Periodic checkpoints serialize $row_{ptr}$, $col_{ind}$, w, $\Phi_V$, $\Phi_E$ arrays along with random number generator states to persistent storage. Write-ahead logging (WAL) ensures crash consistency, with all updates logged before commitment. Snapshots maintain version numbers enabling warm restarts and supporting spectral warm-start optimization.

The implementation maintains numerical stability through a comprehensive precision policy and algorithmic safeguards. In some embodiments, the system defaults to FP32 precision with selective use of TF32 or FP16 for GEMV/SpMV operations when error bounds permit, and FP64 for critical operations including Ritz value extraction and residual norm computation. Curvature computations employ log-domain Sinkhorn iteration to prevent numerical underflow. The Lanczos algorithm implements selective reorthogonalization, triggering full reorthogonalization when orthogonality loss exceeds a threshold $\theta$ derived from the measured condition number $\kappa(L)$. Deterministic execution employs segmented reductions with fixed traversal orders and Kahan or pairwise summation for critical accumulations. All update kernels maintain idempotence or provide compensating actions, enabling failed epochs to be retried from WAL boundaries without state corruption.

The implementation exhibits well-characterized asymptotic complexity for each operator, enabling performance prediction and optimization. With n=|V| vertices, m=|E| edges, k eigenpairs, neighborhood size d, and batch size B, the per-replay complexities are: SpMV/Krylov operations require O(km) operations with memory traffic $\Theta(k(m+n))$; SSSP using $\Delta$-stepping exhibits O(m+n log W) complexity; Lanczos top-k computation requires $O(km+k^2n)$ operations with selective reorthogonalization; Forman curvature computation scales as O(m); batched Sinkhorn optimal transport requires $O(Bd^2I)$ operations with I iterations; and ANN prefiltering exhibits $O(n^\alpha)$ complexity with $0<\alpha<1$ depending on the index structure. Empirically, throughput bottlenecks arise from memory bandwidth limitations for SpMV/SSSP operations and tensor core utilization for batched optimal transport and small dense linear system solves. Roofline analysis guides operator fusion and tiling decisions to maximize hardware utilization.

In some embodiments, the system implements autonomous memory management through curvature-driven compression control loops. Curvature fields K induce compression pressure P, which drives a control loop enforcing memory and quality budgets through the optimization problem:

$$\min_{s \subseteq E} \sum_{e \in S} c(e)$$

subject to $$\sum_{e \in S} k(e) \geq \eta$$

and QoS$\geq\tau$, where c(e) represents edge cost, $\eta$ is the minimum curvature threshold, and $\tau$ is the quality-of-service bound. This knapsack-like selection problem is approximated through greedy thresholding on the ratio $\kappa$/cost implemented as a GPU kernel, with edges falling below threshold marked for pruning during the next compaction cycle.

The implementation ensures reproducible execution and comprehensive testability through multiple mechanisms. All stochastic kernels including recombination and sampling operations utilize recorded random seeds, enabling deterministic replay. Operator DAGs emit compact execution traces including frontier sizes, residual norms, and selected edge sets, facilitating validation of replay equivalence across different builds and hardware configurations. Each kernel may comprise parameterized microbenchmarks with reference implementations, enabling verification of correctness and performance characteristics. Standard test cases can include, but are not limited to, SSSP distance verification on canonical graphs and Lanczos residual norm validation against tolerance bounds.

The following example illustrates application of the Manifold Engine to a naval tactical decision support scenario, demonstrating how the system transforms real-time sensor data and communications into actionable cognitive trajectories. In an exemplary naval deployment scenario, BLUE naval forces employ the Manifold Engine to process and respond to tactical situations involving potential disruptions from RED forces. The system instantiates a three-layer hierarchical manifold structure tailored to naval operations: the fast manifold $M_1$ processes tactical events including sensor detections, vessel positions, speed changes, and course alterations with latencies under 100 milliseconds; the mesoscale manifold $M_2$ maintains doctrinal postures including offensive, defensive, and deception configurations over timescales of minutes to hours; and the foundational manifold $M_3$ encodes long-term strategic identity and operational doctrine specific to naval reasoning norms over days to weeks.

Event streams arrive at rates exceeding 10,000 events per second during active operations, comprising radar tracks, communication intercepts, and blue force position updates, while communication streams include tactical orders, situation reports, and coordination messages between vessels and command centers. The projection operator maps these inputs to graph vertices, with events generating new vertices in the fast manifold and communications creating edges that couple related trajectories. The operator pipeline executes continuously on GPU hardware, with measured latencies under 50 milliseconds from event ingestion to doctrinal update on DGX-class systems. The diffusion operator propagates threat assessments across the sensor network, the geodesic operator computes optimal intercept courses and evasion routes, and the curvature operator identifies redundant sensor reports and overlapping coverage areas, enabling efficient resource allocation.

Traditional naval command systems experience $O(N^2)$ scaling as vessel count increases, with communication overhead overwhelming decision processes beyond 100 participants. The Manifold Engine inverts this relationship: as communication density $\rho_g$ increases, the stabilization time $\tau_c \sim 1/\log (1+\rho_g)$ actually decreases, enabling faster convergence to coherent operational pictures. Experimental validation using historical engagement data with N=100 to 10,000 simulated agents and millions of communications demonstrates that coherence metrics including trajectory alignment and spectral gap improve logarithmically with scale, enabling coordination of large, distributed forces that would overwhelm conventional command systems.

The routing operator extracts high-value trajectories representing recommended courses of action based on the current tactical situation. For a submarine detection scenario, the system generates trajectories encoding optimal search patterns based on last known position and ocean conditions, coordinated sensor deployment across multiple platforms, and communication plans that minimize detection probability while maintaining task force coordination. These trajectories are serialized and presented to naval commanders through existing tactical displays, with each trajectory tagged with confidence metrics derived from curvature analysis and historical pattern matching. The continuous execution ensures recommendations adapt in real-time as new sensor data arrives and threat assessments evolve.

In operational testing, the Manifold Engine demonstrates event processing rates exceeding 50,000 events/second on single GPU hardware, memory usage scaling as $M(n) \sim 173.3 \log (n)$ bits for n events, end-to-end decision latency under 50 ms for critical threats, sustained operation over 72-hour exercises without memory exhaustion, and successful coordination of 1,000+ distributed sensors and platforms. During reduced operational tempo, the recombination operator generates synthetic trajectories combining elements from multiple historical engagements through "dreaming" cycles that consolidate tactical patterns into reusable schemas. This consolidation process operates continuously in background, with fitness evaluation ensuring only coherent combinations persist, leading to progressive refinement of tactical doctrine encoded in the mesoscale and foundational manifolds without requiring explicit retraining or rule updates.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "thought" refers to a discrete unit of reasoning or analysis generated by a large language model or multimodal inference engine during its processing of an input prompt. A thought represents the model's intermediate reasoning steps, contextual interpretation, or internal deliberation that contributes to a final output. Thoughts may be atomic (e.g., a factual claim), structured (e.g., an inference chain), or multimodal (e.g., a fused representation of text and video). Unlike raw tokens or embeddings, thoughts encapsulate processed cognition and are suitable for caching, recombination, and reuse across future interactions. Thoughts may be stored explicitly or synthesized during recall and may evolve through compression or generalization.

As used herein, "thought cache" refers to a structured memory layer configured to store and retrieve thoughts based on semantic similarity, contextual alignment, or system policy. The cache may include multiple tiers, such as session caches for short-term interaction, long-term caches for persistent knowledge, and shared or federated caches across devices or agents. Cached thoughts are indexed in latent space and may be retrieved using vector similarity, trajectory proximity, or geodesic alignment. Cached thoughts may be compressed or abstracted over time to reduce redundancy and support scalable reuse.

As used herein, "generalization" refers to the process of synthesizing a new thought from one or more cached thoughts by identifying shared structure, meaning, or trajectory. Generalized thoughts replace specific exemplars with compressed representations that maintain core semantic content while enabling reuse across a wider range of prompts or tasks. Generalization may occur explicitly during reasoning or asynchronously during background curation or dreaming.

As used herein, "latent manifold" refers to a differentiable subspace within a high-dimensional latent hyperspace in which thoughts and thought trajectories are embedded. The manifold may be defined at a given time and is associated with a metric tensor that governs local distance, curvature, and motion. The manifold forms dynamically through the reuse, compression, and interaction of thoughts and supports operations such as geodesic traversal, memory recall, and structural recombination.

As used herein, "geodesic attention" refers to a formulation of attention in which focus or inference is achieved by computing or approximating a minimal-energy path through the latent manifold. A geodesic attention path minimizes a cognitive action functional that may include kinetic energy, compression pressure, and goal potential. Unlike traditional attention mechanisms that reweight tokens in flat space, geodesic attention produces smooth, structure-respecting flows of reasoning across latent memory.

As used herein, "compression pressure" refers to a scalar field over the latent manifold that encodes semantic density, memory reuse, or representational redundancy. The pressure at a point may be derived from geometric properties such as Ricci curvature and reflects the cost of traversal or storage in that region. High compression pressure indicates overused or ambiguous areas where pruning, generalization, or reorganization may be necessary. Compression pressure influences cache management, memory shaping, and geodesic routing.

As used herein, "goal potential field" refers to a scalar utility function defined over the latent manifold that represents the relevance, desirability, or task-alignment of different regions of thought space. The gradient of this field defines an intent vector field, which biases cognitive traversal toward goal-aligned areas. Goal potential may be determined by user prompts, task specifications, or emergent system objectives, and modulates attention, memory retrieval, and trajectory formation.

As used herein, "intent vector field" refers to a directional field over the latent manifold that encodes cognitive drive or utility gradients. It governs the direction and magnitude of traversal for operations such as memory reentry, inference, or exploration. The intent field may be computed from the gradient of a goal potential, derived from user input, or learned from system experience, and is used to align cognitive motion with target outcomes.

As used herein, "cognitive dynamics engine" or "CDE" refers to an architectural module configured to maintain and evolve the geometry of the latent manifold. The CDE is responsible for computing geodesic paths, estimating curvature, applying compression pressure, and performing structural reorganization, including during background operations such as dreaming. The CDE may expose interfaces for traversal, memory updates, compression, and control feedback, and functions as a substrate-layer system supporting high-level cognition.

As used herein, "dreaming" refers to a background process in which cached thoughts, trajectories, or bundles are perturbed, recombined, or abstracted or otherwise manipulated to improve manifold coherence and memory efficiency. Dreaming may operate during idle cycles or low-load periods and is driven by curvature smoothing, compression pressure, and generalization gain. The process supports the emergence of new thoughts, refinement of existing structures, and long-term memory consolidation.

As used herein, "reinstantiation" refers to the act of reconstructing a prior thought trajectory within the current latent manifold geometry. Due to compression or manifold deformation, original paths may no longer exist in exact form; reinstantiation generates an approximate or adapted version guided by curvature, cached data, and intent fields. Reinstantiation supports memory recall, simulation, and introspective review in systems with dynamic cognitive substrates.

As used herein, "memory basin" or "basin of recurrence" refers to a region of the latent manifold associated with a previously reinforced or frequently reused trajectory. Such basins exhibit high local curvature and geodesic convergence and serve as attractors for memory reentry. Traversal into a basin may trigger reinstantiation, memory reinforcement, or adaptive reuse, depending on system configuration and goal conditions.

As used herein, "typed latent entity" refers to a thought or substructure in the manifold labeled with a semantic or functional type, such as but not limited to fact, opinion, concept, trajectory, affect, cluster, or anchor. Typed entities impose constraints on valid operations such as recombination, interpolation, or pruning. Type-aware computation supports lawful memory manipulation, structured reasoning, and generalization without semantic distortion.

As used herein, "attention vector field" refers to a distributed, time-dependent field defined over the latent manifold that governs the instantaneous direction and magnitude of attentional flow. The field may evolve according to partial differential equations that incorporate compression pressure and goal potential gradients. This dynamic attention formulation enables real-time flow modeling, inference stabilization, and explainability through traceable vector paths.

As used herein, "latent subspace" or "thought bundle" refers to a localized, compressible region of the manifold that contains structurally similar or semantically aligned thoughts. Bundles may form naturally through repeated traversal, co-activation, or recombination, and act as low-energy attractors or semantic zones. Subspaces may support generalization, analogical reasoning, and efficient memory access.

As used herein, "latent recombinator" refers to a functional component or method configured to merge or blend similar thoughts, trajectories, or bundles in the latent manifold to form new abstractions. The recombinator may use geometric proximity, semantic alignment, or reuse statistics to determine legal recombinations, subject to type constraints and curvature continuity. It serves as a key mechanism for memory scaling, abstraction, and thought generation.

As used herein, "structured memory" refers to a persistent, geometry-aware memory architecture in which thoughts are stored not as flat vectors but as positions or paths within an evolving manifold. Structured memory supports context-sensitive access, memory reinforcement through traversal, lawful pruning, and dynamic generalization. It provides a substrate for long-term cognition, introspection, and identity continuity in systems with persistent reasoning capability.

As used herein, "Lorentzian autoencoder" refers to a neural architecture designed to encode spatiotemporal or perceptual input-such as video-into a latent manifold with Lorentzian signature, where one or more dimensions represent time-like directions. The latent structure supports temporally coherent geodesics, semantic compression, and causal continuity. Lorentzian autoencoders enable operations such as zooming, projection, and visual memory traversal.

Conceptual Architecture

FIG. 1 is a block diagram illustrating an exemplary system architecture of a manifold engine for executing a self-evolving property graph on GPU, according to an embodiment. The system architecture 100 comprises multiple interconnected components that collectively realize geometric cognition through continuous execution of GPU-accelerated operators on a dynamic property graph structure.

The system 100 receives input from various sources including, but not limited to: event streams 102 and communication streams 104. Event streams 102 comprise temporal sequences of events $e_i(t)$ that may originate from sensors, user actions, environmental occurrences, or other edge processes. Communication streams 104 comprise temporal sequences of communications $c_{ij}(t)$ representing dialog, rationale, coordination signals, or other information exchanges between processes, roles, or users. These input streams 102, 104 are combined into a structured ensemble 106 represented as $E(t)=\{e_i(t), c_{ij}(t)\}$, which provides a unified representation of experiential input data.

The structured ensemble 106 is processed by a projection operator 108, denoted as @, which maps the external input data into a graph-based representation suitable for geometric processing. The projection operator 108 performs embedding and transformation operations to convert the raw input streams into vertices and edges of a property graph, maintaining temporal ordering and relational structure. In exemplary implementations, projection operator 108 employs pre-trained neural network encoders to generate d-dimensional embeddings, where d typically ranges from 256 to 2048 dimensions. For textual communications, the operator 108 may utilize transformer-based language models with mean pooling over token embeddings. For structured events, domain-specific encoders may map event attributes to fixed-dimensional vectors. The projection process implements the two-stage approach described herein: first identifying candidate vertices through approximate nearest neighbor search, then solving a regularized least-squares problem to determine optimal vertex assignments and edge weights.

The output of the projection operator 108 is stored in a dynamic property graph 110, represented as $G=(V, E, A)$, which resides in GPU memory 112. Dynamic property graph 110 comprises vertices V partitioned into event vertices $V_e$ and communication vertices $V_c$, edges E representing relationships and temporal orderings, and property vectors A assigned to both vertices and edges. The graph data can be using a combination of Compressed Sparse Row (CSR) format for efficient traversal and Coordinate (COO) format for dynamic updates, as indicated in the graph structure.

A plurality of GPU operator kernels operate on dynamic property graph 110 to implement the geometric cognitive processes. These operators include, but are not necessarily limited to: a diffusion operator 120 ($D_t$) that propagates information along graph edges using sparse matrix-vector operations, a geodesic operator 121 (G) that computes minimal path lengths between vertices, a spectral operator 122 ($S_k$) that performs eigendecomposition to reveal global structure, a curvature operator 123 ($\kappa$) that quantifies local geometric properties and compression pressure, a projection operator 124 (P) for mapping external embeddings into the manifold, a recombination operator 125 (R) for generating new trajectories through interpolation, and a routing operator 126 (T) for query-driven trajectory selection.

The execution of these operators 120-126 is controlled by a CUDA graph controller 130, which comprises a DAG Pipeline 132 ($\Pi$) that captures operator sequences as directed acyclic graphs and a stream scheduler 134 that manages concurrent execution across multiple CUDA streams. The CUDA graph controller 130 may be configured to implement self-executing behavior by repeatedly replaying the operator pipelines without external orchestration, thereby enabling continuous evolution of the cognitive manifold.

An action density sampler 140 monitors the density of geometric actions $\rho_g$ arising from the input streams and provides this information to CUDA graph controller 130. The action density $\rho_g$ influences the scheduling of operator execution, with higher densities accelerating condensation processes according to the relationship $\tau_c \sim 1/\log(1+\rho_g)$, where $\tau_c$ represents the stabilization time constant. In exemplary implementations, action density sampler 140 maintains exponentially weighted moving averages of event and communication rates over configurable time windows, (e.g., from 100 ms to 10 s). The sampler computes $\rho_g$ using weighting parameters $\lambda_e$ and $\lambda_c$ that may be dynamically adjusted based on manifold stability metrics. For instance, default values of $\lambda_e$=1.0 and $\lambda_c$=2.0 reflect the higher geometric impact of communications. Sampler 140 periodically (e.g., at 10-100 Hz frequency) updates the density estimate and provides both instantaneous and smoothed estimates to controller 130 for adaptive pipeline scheduling.

System 100 further comprises a hierarchical arrangement of cognitive manifolds 150, 152, 154. The fast manifold $M_1$ 150 encodes event-level dynamics with high temporal resolution. The mesoscale manifold $M_2$ 152 integrates events into decision trajectories operating at intermediate timescales. The foundational manifold $M_3$ 154 maintains long-term identity, values, and reasoning style with slow evolution. These manifolds are coupled through submersion mappings $\varphi_{12}$ and $\varphi_{23}$ that abstract information upward, and immersion mappings $\psi_{32}$ and $\psi_{21}$ that inject constraints downward, as indicated by the bidirectional connections between the manifolds.

System 100 can be configured to produce cognitive output 160 in the form of experiential trajectories $\gamma(t)$, which represent coherent paths through the cognitive manifold that encode meaningful sequences of events and decisions. In exemplary implementations, cognitive output 160 is generated through a multi-stage extraction process. First, the routing operator 126 identifies high-fitness trajectories using a scoring function (e.g., $\sigma(\gamma,q)$) that combines two or more of (but not limited to) proximity, novelty, recency, and trust metrics. Selected trajectories are then serialized into standardized formats such as JSON or Protocol Buffers, containing vertex sequences, edge weights, timestamps, and associated metadata. The output interface supports both streaming and batch modes, with streaming mode emitting trajectory segments as they stabilize (e.g., every 100-1000 ms) and batch mode providing complete trajectories upon request. Output trajectories may be filtered by minimum fitness thresholds, temporal ranges, or semantic queries, enabling integration with downstream reasoning systems or user interfaces. A continuous replay feedback path, shown as a dashed line, enables the output trajectories to influence subsequent processing cycles, implementing the self-executing nature of the architecture.

Through this architecture, manifold engine system 100 enables logarithmic memory growth $M(n)\sim\log n$ and intrinsic stabilization properties that emerge from the geometric operators rather than being imposed through external control mechanisms. The continuous execution model eliminates the distinction between training and inference phases characteristic of conventional neural network architectures, instead maintaining a living computational substrate that evolves under the continuous flow of experiential input.

FIG. 2 illustrates an exemplary operator-to-kernel mapping table 200 showing the correspondence between theoretical geometric operators and their GPU kernel implementations, according to an embodiment. The table 200 provides a systematic mapping that enables the abstract mathematical functionals of geometric cognition to be realized as executable computational kernels on parallel graphics processing hardware.

Table 200 is organized into four primary columns: an operator identification column showing the operator name and mathematical symbol, a mathematical definition column providing the formal specification of each operator, a GPU kernel implementation column detailing the computational algorithms and function interfaces, and a complexity column specifying the asymptotic computational and memory requirements.

The diffusion operator 202 implements heat kernel propagation $D_t f = e^{-tL} f$, where $L = D - A$ represents the graph Laplacian with D being the degree matrix and A the adjacency matrix. The GPU kernel implementation may employ sparse matrix-vector (SpMV) operations combined with Krylov subspace approximation through the function interface diffuse$_{spmv}$(L, f, t, k, s). This implementation constructs the Krylov subspace $K_k(f)$=span $\{f, Lf, \ldots, L^{k-1}f\}$ and projects the solution to approximate $e^{-tL}f$ without explicitly forming the matrix exponential. The computational complexity is $O(k \cdot nnz(L))$ with memory traffic of $\Theta(k(m+n))$, where k represents the Krylov subspace dimension, $nnz(L)$ denotes the number of non-zero entries in the Laplacian, m is the edge count, and n is the vertex count.

The geodesic operator 204 computes shortest paths $G(u,v)$ where $\gamma$ represents a path from vertex u to vertex v and $L(\gamma)$ denotes the path length. The implementation utilizes a $\Delta$-stepping single-source shortest path (SSSP) algorithm through the kernel function sssp$_{delta}$(A, w, S, s), where A is the adjacency structure, w contains edge weights, S specifies source vertices, and s denotes the CUDA stream handle. The algorithm employs bucketed frontiers to separate light and heavy edges for parallel processing, with warp-aggregated atomic operations reducing memory contention. The complexity is $O(|E|+|V| \log W)$, where W represents the weight spread across edges.

The spectral operator 206 performs eigendecomposition to extract global manifold structure through the projection $S_k f$ where $\{\varphi_i\}$ are the eigenvectors corresponding to the k smallest eigenvalues of the Laplacian satisfying $L\varphi_i = \lambda_i \varphi_i$. The GPU implementation employs the Lanczos algorithm with selective reorthogonalization via the kernel interface lanczos$_{topk}$(L, k, $\varepsilon$, s), where $\varepsilon$ specifies the convergence tolerance. The implementation utilizes mixed precision arithmetic, with TF32 or FP32 for general computations and FP64 for critical operations such as Ritz value extraction. Warm-start capabilities enable reuse of previous Ritz vectors when the graph undergoes incremental updates. The computational complexity is $O(km+k^2 n)$ including reorthogonalization costs.

The curvature operator 208 quantifies local geometric properties through two complementary measures. Forman curvature $\kappa_F(e)$ provides computationally efficient edge-local estimates through parallel reductions over two-hop neighborhoods. Ollivier-Ricci curvature $\kappa(u,v)$ employs optimal transport to measure the contraction of probability measures $\mu_u$ and $\mu_v$ supported on vertex neighborhoods, where $W_1$ denotes the 1-Wasserstein distance. The GPU implementation uses batched entropic optimal transport solved via Sinkhorn iteration through the kernel sinkhorn$_{batch}$($\{C_b\}$, $\varepsilon$, $\tau$, I, s), where $C_b$ represents batched cost matrices, $\tau$ is the convergence threshold, and I limits iterations. The implementation employs log-domain arithmetic to prevent numerical underflow. Complexity is $O(m)$ for Forman curvature and $O(Bd^2 I)$ for batched Sinkhorn computation, where B is the batch size and d is the neighborhood size.

The projection operator 210 maps external embeddings into the manifold through $P(x)$ where $\varphi(v)$ represents the vertex embedding and $R(v)$ encodes structural regularization. According to an embodiment, a two-stage GPU implementation first employs approximate nearest neighbor (ANN) search using either IVF-PQ or graph-based indices to identify candidate vertices, then solves a constrained least-squares problem via batched projected conjugate gradient or L-BFGS methods. The optimization enforces simplex constraints $\alpha \geq 0$ and $1^T \alpha = 1$ on the convex combination weights. Computational complexity is $O(n^\alpha)$ for the ANN stage where $\alpha < 1$ is the approximation factor, plus $O(|C|^3)$ for the least-squares solution over the candidate set C.

The recombination operator 212 generates novel trajectories through geodesic interpolation $R(\gamma_1, \gamma_2)$, implementing the cognitive dreaming process. The GPU kernel performs batched interpolation on trajectory embeddings using the formula $z_\alpha = \exp_{z1}(\alpha \log_{z1}(z_2)) + \xi$, where $\alpha \in [0,1]$ controls interpolation and $\xi$ represents stochastic perturbation. Back-projection to feasible graph paths employs local SSSP computation, while fitness evaluation $F[\gamma]$ utilizes parallel reduction operations. The complexity is $O(B|\gamma|)$ where B denotes the batch size and $|\gamma|$ represents trajectory length.

The routing operator 214 identifies optimal trajectories for queries through $T(q)$ where $\sigma$ represents a composite scoring function incorporating proximity, novelty, recency, and trust metrics. The three-stage implementation begins with ANN prefiltering to identify candidates, performs k-radius geodesic expansion to explore local manifold structure, and applies a fused scoring kernel using scatter-gather patterns to minimize memory traffic. Complexity is $O(n^\alpha + k|E'|)$ where E' represents edges in the local expansion neighborhood.

According to table 200: $n = |V|$ represents vertex count, $m = |E|$ represents edge count, k denotes eigenpairs or iteration counts, nnz indicates non-zero entries, B specifies batch sizes, d represents neighborhood dimensions, W denotes weight spread, I indicates iteration limits, s represents CUDA stream handles, $\varepsilon$ (or E) specifies convergence tolerances, and $\alpha$ (or a) represents ANN approximation factors.

Through this systematic operator-to-kernel mapping, the Manifold Engine transforms abstract geometric functionals into concrete GPU computations with well-characterized performance bounds, enabling practical implementation of theoretical cognitive geometry on modern parallel hardware architectures. Each kernel interface is designed to maximize hardware utilization while maintaining numerical stability and supporting the continuous execution model fundamental to the self-executing graph architecture.

Figure 3:
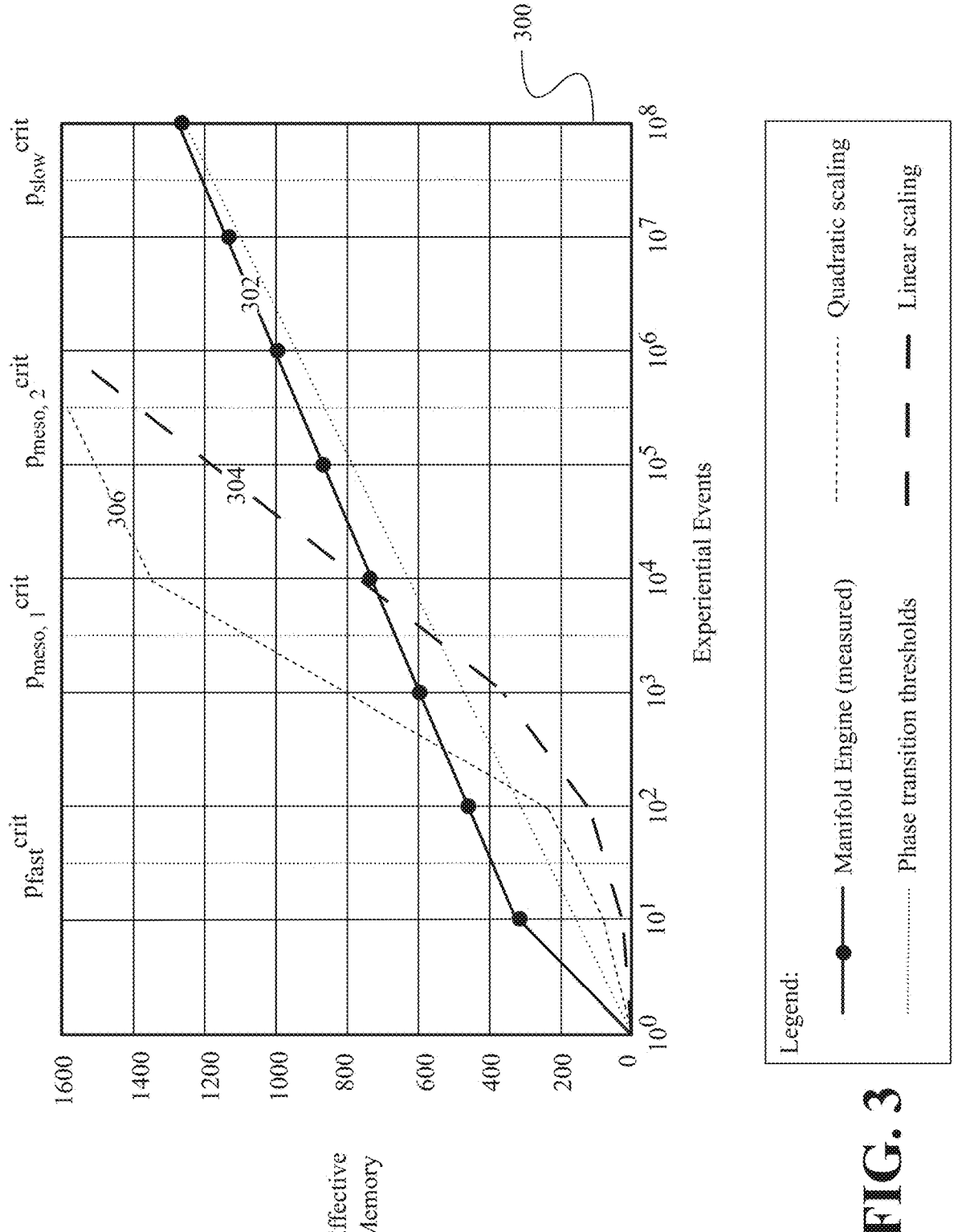
FIG. 3 illustrates an exemplary graph of logarithmic memory scaling curves demonstrating the fundamental scaling advantage of the Manifold Engine compared to conventional cognitive architectures.

FIG. 3 illustrates an exemplary graph of logarithmic memory scaling curves 300 demonstrating the fundamental scaling advantage of the Manifold Engine compared to conventional cognitive architectures. The graph 300 presents empirical measurements and theoretical comparisons on a semi-logarithmic scale, with experiential events n plotted logarithmically along the horizontal axis from $10^0$ to $10^8$, and effective memory M(n) plotted linearly along the vertical axis from 0 to 1600 memory units.

The primary scaling curve 302 represents measured performance of the Manifold Engine, exhibiting logarithmic growth characterized by the relationship $M(n) \sim \log n$. Data points along this curve 302 are marked with solid circles at logarithmic intervals, showing empirical measurements obtained from system execution with increasing experiential volumes. The curve 302 demonstrates that as experiential events increase by orders of magnitude from $10^1$ to $10^8$, the effective memory requirement increases only linearly from approximately 100 to 900 units, confirming the logarithmic scaling law derived herein.

A linear scaling comparison curve 304 illustrates the memory growth pattern O(n) characteristic of traditional storage systems that maintain proportional memory allocation for each experiential input. This curve 304, rendered with a long-dash pattern, shows catastrophic memory exhaustion as it approaches system limits at approximately $10^6$ events, where the curve intersects the upper boundary of available memory. Beyond this point, such systems become computationally intractable without external memory management or data discarding strategies.

A quadratic scaling comparison curve 306 demonstrates the $O(n^2)$ memory growth typical of multi-agent systems (MAS) where coordination overhead scales with the square of participant interactions. This curve 306, shown with a short-dash pattern, exhibits even more rapid memory exhaustion, reaching system limits at approximately $10^4$ events. This quadratic growth represents the fundamental limitation that prevents multi-agent architectures from scaling to large experiential volumes despite their initial promise for distributed cognition.

The graph 300 includes four vertical phase transition markers rendered as very small, dashed lines, indicating critical density thresholds where the Manifold Engine undergoes qualitative behavioral transitions. The first transition $\rho_{fast}^{crit}$ occurs at approximately $10^{1.5}$ events, marking the shift from noise-dominated behavior to coherent flows on fast manifolds. The second transition $\rho_{meso}, 1^{crit}$ at approximately $10^{3.5}$ events indicates the emergence of tactical coherence on mesoscale manifolds. The third transition $\rho_{meso}, 2^{crit}$ at approximately $10^{5.5}$ events represents the onset of generative imagination through recombination processes. The fourth transition $\rho_{slow}^{crit}$ at approximately $10^{7.5}$ events marks the formation of stable doctrinal attractors on foundational manifolds.

As shown, the graph represents the fitted scaling relationship $M(n) = \alpha \log (n) + \beta$, where empirical fitting yields $\alpha \sim 173.3$ as the logarithmic slope coefficient and $\beta \sim 0$ as the intercept. This quantitative relationship enables precise prediction of memory requirements for arbitrary experiential volumes and confirms the theoretical derivation that the marginal memory contribution $dM/dn \sim 1/n$ decreases inversely with accumulated experience.

The logarithmic scaling behavior 302 emerges from the Manifold Engine's compression mechanisms described herein, wherein curvature-driven operators continuously identify and consolidate redundant experiential trajectories. As experiential volume increases, the probability of encountering genuinely novel patterns decreases as $Pr(\text{novel at step } n) \sim 1/n$, causing each additional input to contribute progressively less to the manifold's effective size. This stands in fundamental contrast to architectures that treat each input independently, resulting in linear growth 304, or those that maintain pairwise relationships, yielding quadratic growth 306.

The phase transitions marked on the graph 300 correspond to the critical densities predicted by the operator calculus disclosed herein, where increasing experiential density drives the system through distinct cognitive regimes. These transitions are not artifacts of parameter tuning but emerge naturally from the mathematical structure of the operator algebra, as proven in the theoretical sections of the specification. The logarithmic spacing of these transitions further emphasizes how the Manifold Engine maintains consistent behavior across exponentially increasing scales of operation.

The comparison between curves 302, 304, and 306 demonstrates that only the Manifold Engine's logarithmic scaling enables sustainable cognitive processing at scale. While traditional systems 304 and multi-agent systems 306 encounter hard computational limits that prevent scaling beyond $10^6$ and $10^4$ events respectively, the Manifold Engine 302 maintains tractable memory requirements even at 108 events and beyond. This fundamental scaling advantage, combined with the intrinsic stabilization time $\tau_c \sim 1/\log(1+\rho_g)$ that accelerates with experiential density, establishes the Manifold Engine as a cognitive architecture capable of unbounded experiential accumulation without performance degradation.

Figure 4:
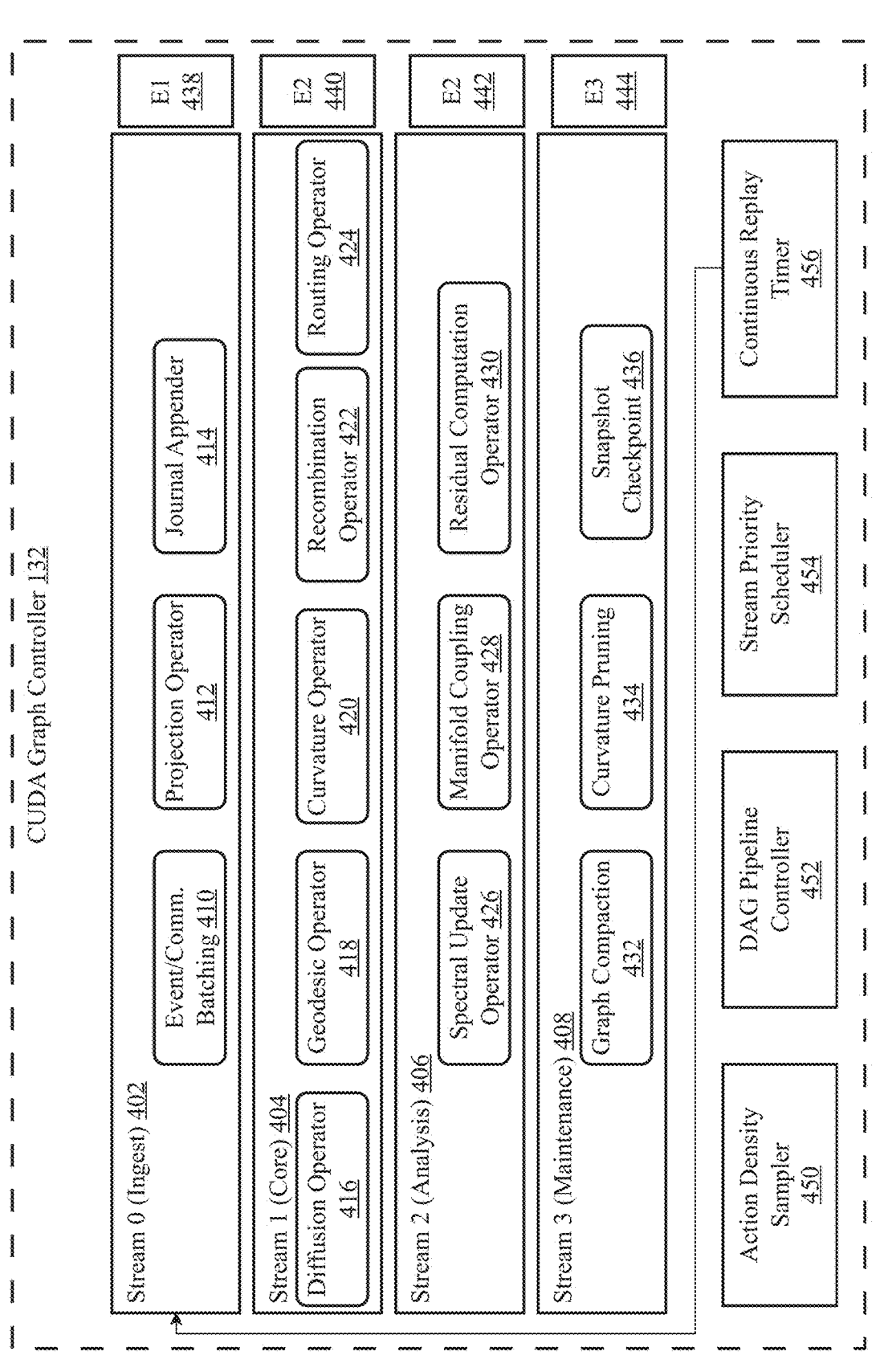
FIG. 4 is a block diagram illustrating an exemplary CUDA Graph orchestration loop that implements the self-executing behavior of the Manifold Engine through coordinated parallel execution streams and automated replay mechanisms.

FIG. 4 is a block diagram illustrating an exemplary CUDA Graph orchestration loop 400 that implements the self-executing behavior of the Manifold Engine through coordinated parallel execution streams and automated replay mechanisms. The orchestration loop 400 operates within the CUDA graph controller 132, shown as a dashed container, which manages the continuous execution of operator pipelines without external scheduling intervention.

The orchestration architecture comprises multiple distinct CUDA streams 402, 404, 406, 408 that execute concurrently with managed synchronization points. Stream 0 402, designated as the ingest stream, handles the initial processing of experiential inputs. This stream executes various operations including, but not limited to: event and communication batching 410 that accumulates inputs into efficient processing units, the projection operator 412 that maps external data into graph vertices using the two-stage process described in Section 8.2.5, and journal append operations via appender 414 that record graph modifications in GPU-resident ring buffers for crash consistency and dynamic updates.

Stream 1 404 implements the core operator pipeline that realizes the fundamental geometric computations of the Manifold Engine. This stream executes various operators in sequence: the diffusion operator 416 performing heat kernel propagation via sparse matrix-vector operations, the geodesic operator 418 computing shortest paths through Δ-stepping algorithms, the curvature operator 420 calculating Forman or Ollivier-Ricci curvature to quantify compression pressure, the recombination operator 422 generating novel trajectories through geodesic interpolation, and the routing operator 424 identifying optimal paths for query responses. These operators can be configured to execute as a captured CUDA Graph, enabling single-submission execution of the entire pipeline with minimal kernel launch overhead.

Stream 2 406 performs analytical operations that maintain global manifold structure and hierarchical coherence. The spectral update operator 426 employs the Lanczos algorithm to refresh eigendecomposition as the graph evolves, providing low-dimensional representations essential for manifold condensation. The manifold coupling operator 428 computes submersion mappings q and immersion mappings ψ between hierarchical layers, maintaining consistency across fast, mesoscale, and foundational manifolds. The residual computation operator 430 evaluates cognitive tension C(p) $=d_{M3}(u(p), d(p))$ to drive metacognitive correction through gradient descent on the foundational manifold.

Stream 3 408 handles maintenance operations that ensure long-term system stability and efficiency. The graph compaction operator 432 periodically merges COO-format journals into the CSR representation, amortizing the cost of dynamic updates while maintaining deterministic execution. The curvature pruning operator 434 implements the compression control loop described herein, removing edges with curvature below threshold $\kappa < \kappa_{min}$ to bound memory growth. The snapshot checkpoint operator 436 persists graph state, operator parameters, and random number generator seeds to enable warm restarts and fault tolerance.

The streams coordinate through explicit synchronization events 438, 440, 442, 444 marked as E1 through E4, which enforce critical dependencies while maximizing parallel execution. Event E1 438 ensures journal append completion before core operators access new graph data. Event E2 440 synchronizes the completion of ingest operations before core pipeline execution. Event E3 442 guarantees core operator completion before maintenance operations that might modify graph structure. Event E4 444 coordinates maintenance completion before the next replay cycle begins.

The orchestration loop 400 is governed by four control components that adapt execution to system state and input characteristics. The action density sampler 450 continuously monitors the rate of geometric actions $\rho_g$ providing real-time estimates that influence scheduling decisions. The DAG pipeline controller 452 manages the captured CUDA Graphs representing operator sequences, updating parameters between replays without graph recapture overhead. The stream priority scheduler 454 implements preemptive prioritization with P0>P1>P2>P3, ensuring latency-sensitive operations such as event ingestion and query routing preempt background computations like spectral updates. The continuous replay timer 456 triggers pipeline execution at frequency $f_{replay}=k \cdot \log(1+\rho_g)$, where k is a scaling constant, implementing the adaptive execution rate that accelerates with increasing experiential density.

A continuous replay loop connects the replay timer 456 output back to the stream initiation point, implementing the self-executing nature of the architecture. This feedback mechanism ensures that operator pipelines execute continuously without external control, with the replay frequency dynamically adjusted based on measured action density. The feedback from control components to execution streams, while not explicitly shown in the diagram, manifests through parameter updates, priority adjustments, and scheduling modifications that optimize performance based on system state.

A plurality of performance metrics may be monitoring and collected which specifies key operational parameters of the orchestration system. The replay frequency formula $f_{replay}$ quantifies how execution rate scales with experiential density. Stream priorities implement preemptive scheduling to maintain responsiveness under load. For instance, Kernel fusion may be configured to activate when register pressure remains below 80%, increasing arithmetic intensity by combining operations. Graph capture may occur once per parameter update, amortizing setup costs across many replays. Event synchronization overhead remains below 0.1% of kernel execution time through efficient implementation. End-to-end pipeline latency ranges from 10-50 milliseconds, enabling real-time cognitive processing.

Through this orchestration architecture, the Manifold Engine enables continuous execution of geometric operators with minimal overhead, adaptive performance scaling, and robust synchronization. The separation of concerns across streams (ingestion, core operations, analysis, and maintenance) enables efficient resource utilization while maintaining deterministic execution order. The automated replay mechanism eliminates the need for external scheduling, making the graph truly self-executing as operator dynamics drive continued evolution of the cognitive manifold.

Figure 5:
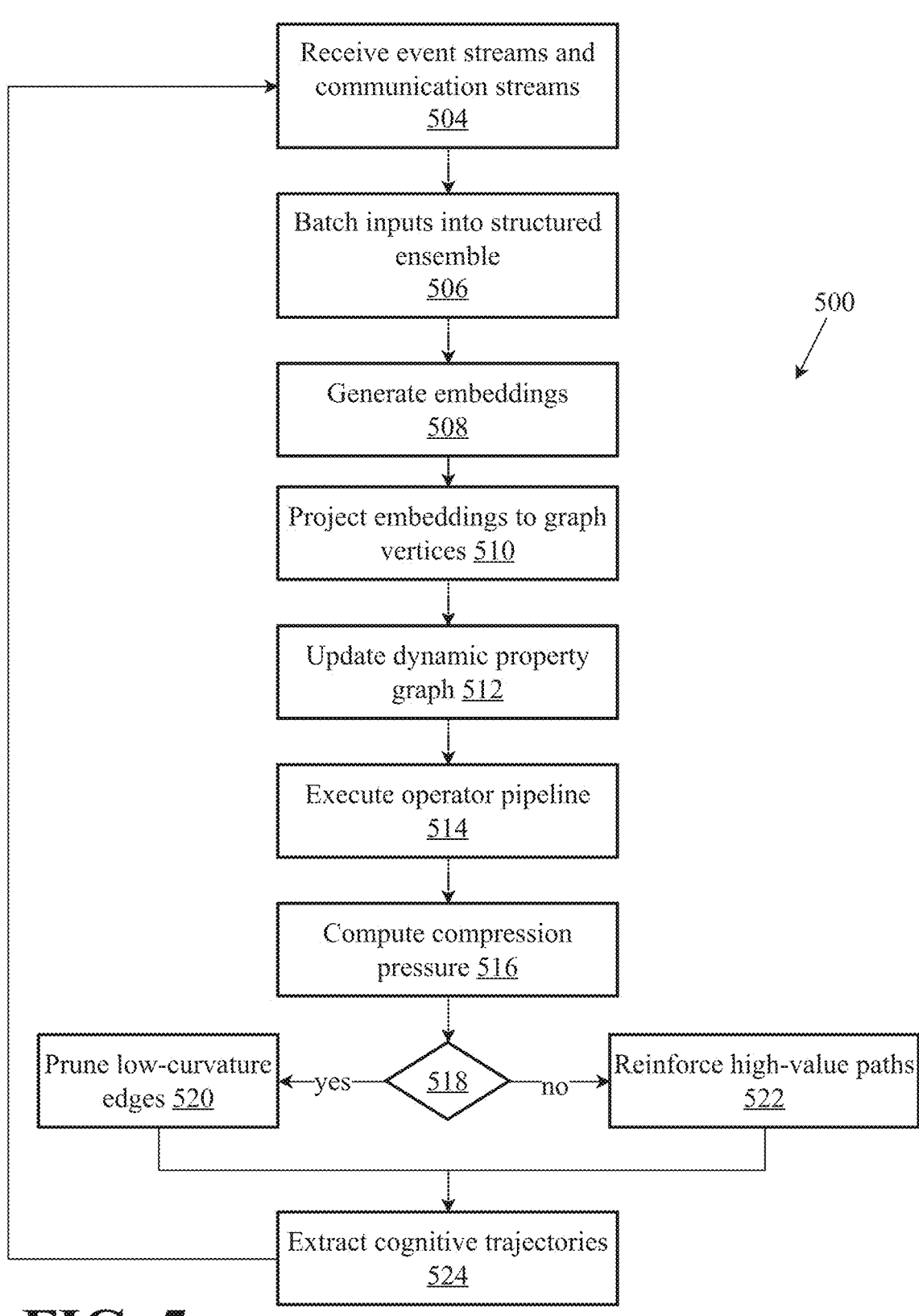
FIG. 5 is a flow diagram illustrating an exemplary method for processing experiential input into cognitive trajectories, according to an embodiment.

FIG. 5 is a flow diagram illustrating an exemplary method 500 for processing experiential input into cognitive trajectories, according to an embodiment. The method 500 demonstrates the core computational process through which the Manifold Engine transforms streams of events and communications into meaningful cognitive trajectories that encode experiential knowledge.

The method begins at step 504 with receiving, retrieving, or otherwise obtaining a plurality of data input streams. In some implementations, the plurality of data input streams comprises event streams $e_i(t)$ and communication streams $c_{ij}(t)$ from external sources. The event streams may comprise temporal sequences of discrete occurrences such as sensor observations, user actions, environmental changes, or system state transitions. The communication streams may comprise messages, signals, coordination data, or other information exchanges between processes, agents, roles, or users. These input streams maintain temporal ordering through associated timestamps $\tau(e_i)$ and $\tau(c_{ij})$, preserving the causal relationships essential for cognitive processing.

At step 506, the method batches the received inputs into a structured ensemble $E(t)=\{e_i(t), c_{ij}(t)\}$. This batching operation may accumulate individual events and communications into processing units of configurable size, typically (but not necessarily) ranging from 100 to 1000 elements, to optimize GPU throughput while maintaining temporal coherence. The structured ensemble provides a unified representation that treats events and communications as complementary aspects of experiential flow rather than separate data types.

Step 508 generates embeddings $\varphi(x)\in R^m$ for each element in the structured ensemble using pre-trained encoders. For textual communications, the method may employ transformer-based language models that produce dense vector representations through mean pooling over token embeddings. For structured events, domain-specific encoders map event attributes to fixed-dimensional vectors, with embedding dimensionality m typically (but not necessarily) ranging from 256 to 2048 dimensions depending on the complexity of the experiential domain and the particular implementation of an embodiment. These embeddings provide the continuous representations necessary for geometric processing in subsequent steps.

At step 510, the method projects the embeddings to vertices in the dynamic property graph through the optimization P(x) where q(v) represents existing vertex embeddings, x is the new embedding to be projected, and R(v) encodes structural regularization that biases projection toward maintaining graph coherence. This projection employs the two-stage process herein: first identifying candidate vertices through approximate nearest neighbor search, then solving a regularized least-squares problem to determine optimal vertex assignments and edge weights.

Step 512 updates the dynamic property graph structure $G=(V\cup V_{new}, E\cup E_{new}, A)$, incorporating newly projected vertices $V_{new}$ and their associated edges $E_{new}$ into the existing graph. The update operation maintains the graph's CSR representation for efficient traversal while recording modifications in COO-format journals for crash consistency. Property vectors A are updated to reflect the attributes, embeddings, and metadata associated with new graph elements.

At step 514, the method executes the operator pipeline $\Pi$ comprising the sequence: Diffusion $D_t\rightarrow$Geodesic $G\rightarrow$Spectral $S_k\rightarrow$Curvature $\kappa\rightarrow$Recombination R. The diffusion operator propagates information along graph edges using heat kernel approximation. The geodesic operator computes shortest paths to establish cognitive distances. The spectral operator extracts global structure through eigendecomposition. The curvature operator quantifies local geometric properties that indicate redundancy or significance. The recombination operator generates novel trajectories through geodesic interpolation. This pipeline execution realizes the geometric transformation of graph structure into cognitive manifold dynamics.

Step 516 computes compression pressure $P(z)=\|\nabla\cdot\vec{v}(z)\|$ from the curvature field generated in the previous step. The compression pressure quantifies the local redundancy in the manifold, with high pressure indicating regions where multiple trajectories converge and can be consolidated. This metric drives the subsequent pruning decisions that enable logarithmic memory scaling by identifying which graph elements can be removed without loss of essential structure.

At decision point 518, the method evaluates whether the curvature $\kappa(e)$ of each edge e falls below a predetermined threshold $\kappa_{threshold}$. This decision implements the fundamental mechanism for bounded memory growth: edges with curvature below threshold represent redundant connections that can be removed without compromising the manifold's ability to represent experiential structure.

When $\kappa(e)<\kappa_{threshold}$ (Yes branch), the method proceeds to step 520 where it prunes low-curvature edges from the graph. This pruning operation removes redundant connections while preserving the graph's topological structure and maintaining paths between cognitively significant vertices. The pruning ensures that memory growth follows $M(n)\sim\log n$ rather than linear scaling.

When $\kappa(e)\geq\kappa_{threshold}$ (No branch), the method proceeds to step 522 where it reinforces high-value paths by strengthening edge weights, updating vertex properties, or marking trajectories for preservation during future pruning cycles. This reinforcement ensures that significant experiential patterns are retained and made more prominent in the cognitive structure.

The two branches converge at a merge point where the method continues to step 524, which extracts cognitive trajectories $\gamma(t)$ using the routing operator T(q). The routing operator identifies high-fitness paths through the manifold by combining multiple scoring criteria including proximity to query points, novelty relative to existing trajectories, recency of updates, and trust metrics derived from trajectory stability. The extracted trajectories represent coherent sequences of experiential states that encode learned patterns, decisions, or behavioral sequences.

A continuous execution loop connects the output of trajectory extraction back to the initial input reception step 504. This feedback mechanism implements the self-executing nature of the Manifold Engine, where the method continuously processes new experiential inputs without requiring external control or discrete processing phases. The continuous execution ensures that the cognitive manifold evolves in real-time as new experiences arrive, maintaining a living computational substrate that adapts to changing inputs while preserving learned structure.

The method 500 supports several critical objectives through its design. First, it transforms discrete experiential inputs into continuous geometric representations suitable for manifold processing. Second, it implements logarithmic memory scaling through curvature-based pruning that identifies and removes redundancy. Third, it maintains temporal coherence by preserving causal relationships throughout the processing pipeline. Fourth, it enables continuous learning without separate training and inference phases. These properties collectively enable the Manifold Engine to process unbounded experiential streams while maintaining tractable computational requirements.

Figure 6:
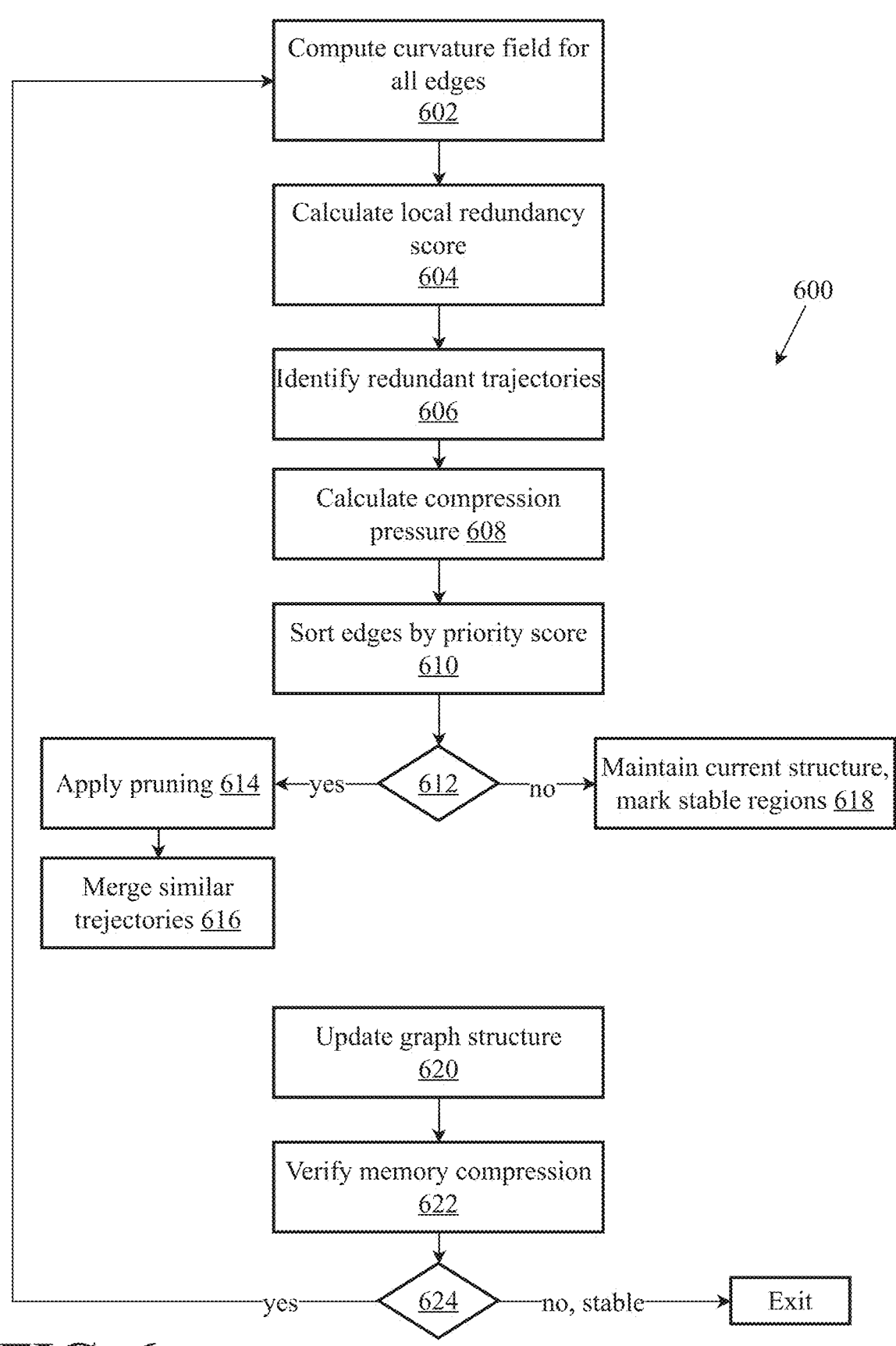
FIG. 6 is a flow diagram illustrating an exemplary method for achieving logarithmic memory compression in the Manifold Engine through curvature-driven pruning and trajectory consolidation, according to an embodiment.

FIG. 6 is a flow diagram illustrating an exemplary method 600 for achieving logarithmic memory compression in the Manifold Engine through curvature-driven pruning and trajectory consolidation, according to an embodiment. The method 600 implements the mathematical principles that enable memory requirements to scale as $M(n)\sim\log n$ with respect to experiential volume n, providing a fundamental computational advantage over conventional cognitive architectures.

According to the embodiment, the process begins at step 602 by computing a curvature field $\kappa(e)$ for all edges $e \in E$ in the dynamic property graph. The curvature computation employs two complementary measures: Forman curvature for computationally efficient local estimates based on edge weights and neighborhood structure, and Ollivier-Ricci curvature for more refined measurements using optimal transport between probability distributions on vertex neighborhoods. Low curvature values indicate edges that connect redundant or parallel paths through the manifold, while high curvature identifies structurally significant connections that maintain manifold topology.

At step 604, the method calculates a local redundancy score $R(v) = \tau_{e \in N(v)}(1/\kappa(e))$ for each vertex v, where $N(v)$ denotes the neighborhood of v. This redundancy score aggregates the inverse curvatures of incident edges, providing a vertex-level measure of local redundancy. Vertices with high redundancy scores are candidates for consolidation, as they participate in multiple low-curvature paths that encode similar experiential information.

Step 606 identifies redundant trajectories by evaluating pairs of trajectories $\gamma_i$ and $\gamma_j$ according to two criteria: similarity $S(\gamma_i, \gamma_j) > S_{threshold}$ and min $(\kappa(\gamma_i), \kappa(\gamma_j)) < \kappa_{min}$. The similarity measure S quantifies the geometric or semantic distance between trajectories, while the curvature constraint ensures that only low-value trajectories are considered for consolidation. This dual criterion prevents the method from merging trajectories that, despite similarity, encode distinct high-value experiential patterns.

At step 608, the method calculates compression pressure $P(z) = \|\nabla \cdot \vec{v}(z)\|$ from the velocity field $\vec{v}$ induced by trajectory flows through the manifold. The compression pressure quantifies the local convergence of experiential flows, with high pressure indicating regions where multiple trajectories can be consolidated without information loss. This pressure field provides a global view of compressibility that complements the local curvature measurements.

Step 610 sorts edges by a priority score which may be defined as $Priority(e) = \kappa(e)/cost(e)$, where $cost(e)$ represents the computational or memory cost of maintaining edge e. This priority metric balances the structural importance of an edge (measured by curvature) against its resource consumption, enabling efficient pruning decisions that maximize memory savings while preserving essential manifold structure.

At decision point 612, the method evaluates whether the current memory usage $M_{current}$ exceeds the target memory bound $M_{target}$. The target bound is computed as $M_{target} = \alpha \log(n) + \beta$, where n is the cumulative number of processed experiential inputs and $\alpha$, $\beta$ are system parameters determined empirically. This comparison determines whether active compression is necessary or whether the system can maintain its current structure.

When $M_{current} > M_{target}$ (Yes branch), the method proceeds to step 614 where it applies greedy pruning by removing edges whose priority scores fall below a threshold $\theta$. The threshold is dynamically adjusted to achieve the target memory bound while maximizing the retention of high-priority edges. This greedy approach provides an efficient approximation to the optimal pruning problem, with computational complexity $O(|E|\log|E|)$ for the sorting operation.

Following pruning, step 616 merges similar trajectories identified in step 606. The merging operation computes a weighted average trajectory $\gamma_{merged} = weighted_{avg}(\gamma_i, \gamma_j)$ that preserves the essential geometric properties of both input trajectories. Edge weights are updated to reflect the combined significance of merged paths, ensuring that frequently traversed experiential patterns maintain appropriate representation in the compressed manifold.

When $M_{current} \leq M_{target}$ (No branch), the method proceeds to step 618 where it maintains the current graph structure and marks stable regions that have achieved efficient compression. These marked regions can be excluded from future compression passes, reducing computational overhead for well-compressed portions of the manifold.

Both branches converge at step 620, where the method updates the graph structure G by rebuilding the Compressed Sparse Row (CSR) representation from accumulated journal entries. This reconstruction amortizes the cost of individual edge deletions and vertex merges, maintaining efficient graph traversal properties despite dynamic modifications.

Step 622 verifies that the memory scaling follows the theoretical bound $M(n) \sim \alpha \log(n) + \beta$ by computing the actual memory usage and comparing it to the predicted logarithmic growth curve. Based on this verification, the method updates compression parameters including the pruning threshold $\theta$, similarity threshold $S_{threshold}$, and target bounds to maintain adherence to logarithmic scaling. This adaptive parameter adjustment ensures robust performance across varying experiential densities and content distributions.

At decision point 624, the method determines whether new inputs are available for processing. When new inputs are available (Yes branch), the method returns to step 602 to process the next batch of experiential data, implementing continuous compression as the manifold evolves. When no new inputs are available (No branch), the method exits the compression loop, leaving the manifold in a stable compressed state.

The mathematical foundation for logarithmic scaling emerges from the insight that the probability of encountering genuinely novel experiential patterns decreases as $Pr(novel) \sim 1/n$ with accumulated experience. This leads to a marginal memory contribution $dM/dn \sim 1/n$, which upon integration yields $M(n) \sim \log(n)$. The method 600 realizes this theoretical scaling through the systematic identification and removal of redundancy via curvature-based pruning, ensuring that only structurally significant patterns consume memory resources.

Figure 7:
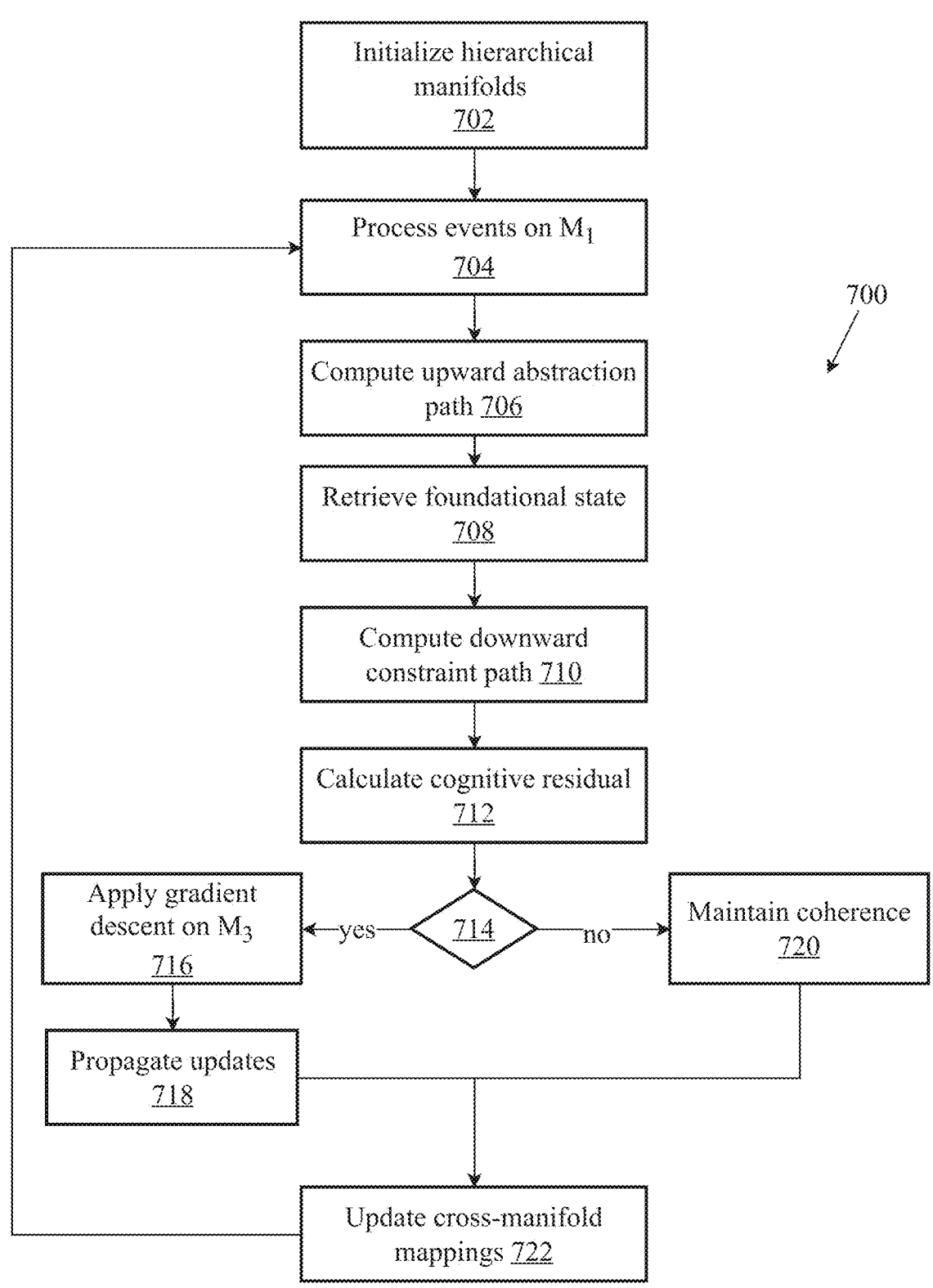
FIG. 7 is a flow diagram illustrating an exemplary method for hierarchical manifold coordination that implements metacognitive control across multiple temporal scales in the Manifold Engine, according to an embodiment.

FIG. 7 is a flow diagram illustrating an exemplary method 700 for hierarchical manifold coordination that implements metacognitive control across multiple temporal scales in the Manifold Engine, according to an embodiment. The method 700 enables the system to maintain coherence between fast experiential processing, intermediate decision-making, and slow foundational values through bidirectional geometric mappings and residual minimization.

According to an embodiment, the process begins at step 702 by initializing a hierarchical structure comprising multiple cognitive manifolds operating at distinct temporal scales. In a preferred embodiment, at least three cognitive manifolds are configured to operate at distinct temporal scales. A fast manifold $M_1$ processes events at the cognitive edge with timescales ranging from milliseconds to seconds, encoding immediate sensory observations and reactive behaviors. The mesoscale manifold $M_2$ integrates events into decision trajectories and tactical patterns over minutes to hours. The foundational manifold $M_3$ maintains long-term identity, values, and reasoning style with evolution occurring over days to months. The temporal separation $\Delta t_1 \ll \Delta t_2 \ll \Delta t_3$ ensures that each layer can stabilize before influencing others, preventing oscillatory instabilities.

At step 704, the method processes incoming events on the fast manifold $M_1$, generating experiential trajectories $\gamma_1(t)$ that encode sequences of observations and actions. These trajectories evolve according to the geometric operators described in previous figures, with diffusion, geodesic flow, and curvature shaping the local manifold structure. The fast manifold maintains high temporal resolution to capture fine-grained experiential details while remaining responsive to rapid environmental changes.

Step 706 computes the upward abstraction path through a composition of Riemannian submersion mappings. First, the mapping $\varphi_{12}$: $M_1 \rightarrow M_2$ abstracts fast trajectories into mesoscale representations, preserving geodesic structure while reducing dimensionality. This submersion identifies patterns across multiple fast events, extracting decision-relevant features while discarding high-frequency noise. Second, the mapping $\varphi_{23}$: $M_2 \rightarrow M_3$ further abstracts mesoscale trajectories into foundational structures, identifying persistent behavioral patterns and value alignments. The complete upward path $u(p)=(\varphi_{23}°\varphi_{12})(p)$ transforms a point $p \in M_1$ into its corresponding representation in the foundational manifold $M_3$.

At step 708, the method retrieves the current foundational state $r \in M_3$, which encodes the system's core identity constraints, learned values, and established reasoning patterns. This foundational state serves as the source of top-down constraints that ensure behavioral consistency across varying contexts. The retrieval operation accesses the slowly evolving structures that have been consolidated through extended experience and metacognitive refinement.

Step 710 computes the downward constraint path through Riemannian immersion mappings that inject high-level constraints into lower manifolds. The mapping $\psi_{32}$: $M_3 \rightarrow M_2$ transforms foundational values into tactical constraints, restricting the space of allowable decisions to those consistent with core identity. The mapping $\psi_{21}$: $M_2 \rightarrow M_1$ further transforms tactical constraints into immediate behavioral restrictions, defining admissible event responses. The complete downward path $d(p)=(\psi_{32}^{-1}°\psi_{21}^{-1})(p)$ represents the constraint propagation from foundation to edge, where the inverse mappings are used to trace constraints back to their foundational source.

At step 712, the method calculates the cognitive residual $C(p)=d_{M3}(u(p), d(p))$, which quantifies the divergence between the upward abstraction of current experience and the downward projection of foundational constraints. This residual measures cognitive tension: high values indicate that current experiences are generating abstractions inconsistent with established values, while low values confirm alignment between bottom-up processing and top-down constraints. The distance metric $d_{M3}$ is computed in the foundational manifold where both paths converge, ensuring commensurability. Decision point 714 evaluates whether the cognitive residual $C(p)$ exceeds a predetermined threshold $C_{threshold}$. This threshold determines the system's tolerance for cognitive tension before triggering corrective action. The threshold value may be set based on system requirements for behavioral consistency versus adaptability, with lower thresholds producing more rigid adherence to established patterns and higher thresholds allowing greater behavioral flexibility.

When $C(p) > C_{threshold}$ (Yes branch), the method proceeds to step 716 where it applies gradient descent on the foundational manifold $M_3$ to reduce cognitive tension. The update rule $dr/dt = -\nabla_{M3}C(r)$ modifies the foundational state r in the direction that minimizes the residual functional C. This gradient descent implements metacognitive learning: the system adjusts its core values and constraints based on persistent patterns in experiential data that cannot be accommodated within existing frameworks. The learning rate is typically set much lower than fast manifold dynamics, ensuring stable adaptation rather than reactive fluctuation.

Following gradient descent, step 718 propagates the updated constraints from the foundational manifold through the hierarchy: $M_3 \rightarrow M_2 \rightarrow M_1$. This propagation updates the immersion mappings $\psi_{32}$ and $\psi_{21}$ to reflect the modified foundational state, ensuring that future behavioral constraints align with the adjusted values. The propagation maintains consistency across all three manifolds while preserving their temporal separation.

When $C(p) \leq C_{threshold}$ (No branch), the method proceeds to step 720 where it maintains current coherence without modification, recording stability metrics such as residual magnitude, convergence rate, and constraint satisfaction. These metrics provide feedback on system stability and can trigger parameter adjustments if coherence degrades over time.

Both branches converge at step 722, where the method updates the cross-manifold mappings $\varphi$ and $\psi$ to improve future coordination. These updates may include refining the dimensionality reduction in submersions, adjusting the constraint strength in immersions, or modifying the mapping kernels based on observed residual patterns. The updates employ online learning algorithms that incrementally improve mapping accuracy without disrupting established structures.

A continuous coordination loop returns the method to step 704, implementing ongoing hierarchical control as new events arrive. This continuous execution ensures that the system maintains coherence across temporal scales while adapting to experiential input. The separation of timescales prevents tight coupling between layers: fast dynamics can explore local variations while being guided by stable constraints, mesoscale patterns can emerge and stabilize before influencing identity, and foundational structures can evolve based on persistent evidence rather than transient fluctuations.

The hierarchical coordination method 700 realizes several key principles of metacognitive control. First, it implements bidirectional information flow where bottom-up abstraction meets top-down constraint, creating a tension that drives learning. Second, it maintains temporal separation that allows each cognitive layer to operate at its natural timescale without interference. Third, it provides a principled mechanism for value learning through residual minimization rather than external reward signals. These properties enable the Manifold Engine to exhibit coherent behavior that remains consistent with learned identity while adapting to new experiences, solving a fundamental challenge in cognitive architectures.

FIG. 8 is a flow diagram illustrating an exemplary method 800 for adaptive pipeline scheduling that enables the Manifold Engine to self-regulate its execution frequency based on experiential density and system performance, according to an embodiment. The method 800 implements a density-driven control mechanism that ensures computational resources are allocated efficiently while maintaining real-time responsiveness to varying input rates.

According to the embodiment, the process begins at step 802 by sampling action density $\rho_g$ from incoming event and communication streams. This sampling operation monitors the rate at which geometric actions arrive at the system, distinguishing between events $e_i(t)$ that represent discrete occurrences and communications $c_{ij}(t)$ that encode coordination or semantic exchanges. The sampling occurs continuously at rates between 10 and 100 Hz, providing real-time estimates of experiential flow without introducing significant computational overhead.

At step 804, the method computes an exponentially weighted moving average of the action density using the formula for $\rho_g$, where T represents the averaging window, $\zeta_e$ is the weighting factor for events, and $\lambda_c$ is the weighting factor for communications. The exponential weighting ensures recent activity has greater influence on the density estimate while maintaining smoothness across temporal fluctuations. As an example, default parameter values of $\lambda_e=1.0$ and $\lambda\_c=2.0$ reflect the empirical observation that communications typically induce greater geometric effects than isolated events, as they create coupling between trajectories and increase local curvature. The averaging window T may be configurable from 100 milliseconds to 10 seconds, allowing adaptation to different operational contexts.

Step 806 calculates the pipeline replay frequency using the relationship $f_{replay}=k\cdot\log(1+\rho_g)$, where k is a scaling constant that determines the overall frequency range. This logarithmic relationship ensures that replay frequency increases with experiential density but with diminishing returns, preventing runaway acceleration under extreme load conditions. The logarithmic scaling mirrors the fundamental memory scaling law $M(n)\sim\log n$, creating a self-consistent control mechanism where both memory usage and execution frequency follow similar mathematical relationships. The scaling constant k is typically (but not necessarily) set to achieve baseline frequencies between 20 Hz and 1 kHz, depending on application requirements.

At step 808, the method determines the characteristic stabilization time $\tau_c\sim1/\log(1+\rho_g)$, which represents the expected time for the cognitive manifold to achieve coherent structure after perturbation. This inverse relationship with action density reflects a fundamental property of the Manifold Engine: higher experiential density accelerates convergence rather than degrading it, as redundant inputs are more quickly identified and consolidated through compression mechanisms. The stabilization time informs subsequent scheduling decisions by indicating how rapidly the system can absorb new inputs without destabilizing existing structures. Decision point 810 assesses current system load by evaluating metrics including, but not limited to, GPU utilization, memory bandwidth consumption, and stream queue depths. This assessment determines whether the system is operating under normal conditions or experiencing resource constraints that require priority adjustment. In an exemplary embodiment, the load threshold is set at 80% of theoretical capacity to maintain headroom for burst handling while maximizing throughput under steady-state conditions.

When system load exceeds the threshold (Yes branch), the method proceeds to step 812 where it updates stream priorities to favor critical operations under constrained resources. The ingest stream (P0) receives HIGH priority to ensure new experiential inputs are not dropped, while the analysis stream (P2) receives LOW priority as spectral updates and manifold coupling can be deferred without immediate impact on system function. Core operators (P1) maintain intermediate priority, and maintenance operations (P3) may be suspended entirely under extreme load. This priority adjustment implements graceful degradation, preserving essential cognitive functions while temporarily reducing analytical depth.

When system load remains within normal bounds (No branch), the method proceeds to step 814 where it maintains balanced priorities following the standard hierarchy P0>P1>P2>P3. This balanced scheduling ensures all cognitive functions receive appropriate resources, with preemptive priorities preventing latency-sensitive operations from being blocked by computationally intensive background tasks. The standard scheduling achieves optimal throughput while maintaining bounded latencies for query responses and trajectory extraction.

Both branches converge at step 816, where the method triggers execution of the CUDA Graph pipeline at the calculated frequency $f_{replay}$. This triggering mechanism initiates a complete pass through the operator DAG, including diffusion, geodesic computation, curvature analysis, and other geometric operations captured in the pre-compiled graph structure. The use of CUDA Graphs eliminates kernel launch overhead and ensures deterministic execution order, critical for maintaining reproducible cognitive dynamics. The replay frequency directly controls how often the manifold structure updates in response to accumulated inputs, with higher frequencies providing finer temporal resolution at the cost of increased computational load.

Step 818 monitors performance metrics to assess the effectiveness of current scheduling parameters. Key metrics can include, but are not limited to, pipeline latency measured from input ingestion to trajectory output, memory utilization tracked against the theoretical bound $M(n)\sim\log n$, and GPU utilization targeting the optimal range of 60-80%. Additional metrics such as stream synchronization overhead, cache hit rates, and numerical stability indicators provide comprehensive visibility into system health. This monitoring operates continuously with minimal overhead, using hardware performance counters and lightweight software instrumentation.

At decision point 820, the method evaluates whether performance has degraded below acceptable thresholds. Performance degradation may manifest as pipeline latencies exceeding the exemplary 10-50 millisecond target range, memory growth deviating from logarithmic scaling, or GPU utilization falling outside the optimal band. The decision also considers trend analysis to detect gradual degradation before it impacts user-visible performance.

When performance degradation is detected (Yes branch), the method proceeds to step 822 where it adjusts control parameters to restore optimal operation. Adjustable parameters include the scaling constant k, which modifies the overall replay frequency range; the weighting factors $\lambda_e$ and $\lambda_c$, which alter the relative influence of events versus communications; and the averaging window T, which affects the responsiveness of density estimates. Parameter adjustment employs gradient-free optimization guided by performance gradients, with small incremental changes to avoid destabilizing the control loop.

When performance remains within acceptable bounds (No branch), the method proceeds to step 824 where it continues with current settings, maintaining stable operation without unnecessary parameter perturbation. This hysteresis in the control logic prevents oscillatory behavior that could arise from overly aggressive optimization.

The method implements continuous adaptation through feedback paths that return to the initial density sampling step 802. This creates a closed-loop control system that automatically adjusts to changing experiential patterns, system loads, and performance characteristics without external intervention. The continuous nature ensures the Manifold Engine remains self-executing, with scheduling decisions emerging from the interaction between experiential density and system state rather than being imposed by external orchestration.

Through adaptive scheduling, the method 800 achieves several critical objectives. First, it ensures computational resources are allocated proportionally to experiential richness, with dense periods receiving more frequent updates. Second, it prevents system overload through priority adjustment and graceful degradation. Third, it maintains performance within specified bounds through continuous monitoring and parameter adaptation. These properties enable the Manifold Engine to operate efficiently across widely varying workloads while preserving the self-executing characteristic fundamental to its architecture.

Exemplary Computing Environment

Figure 9:
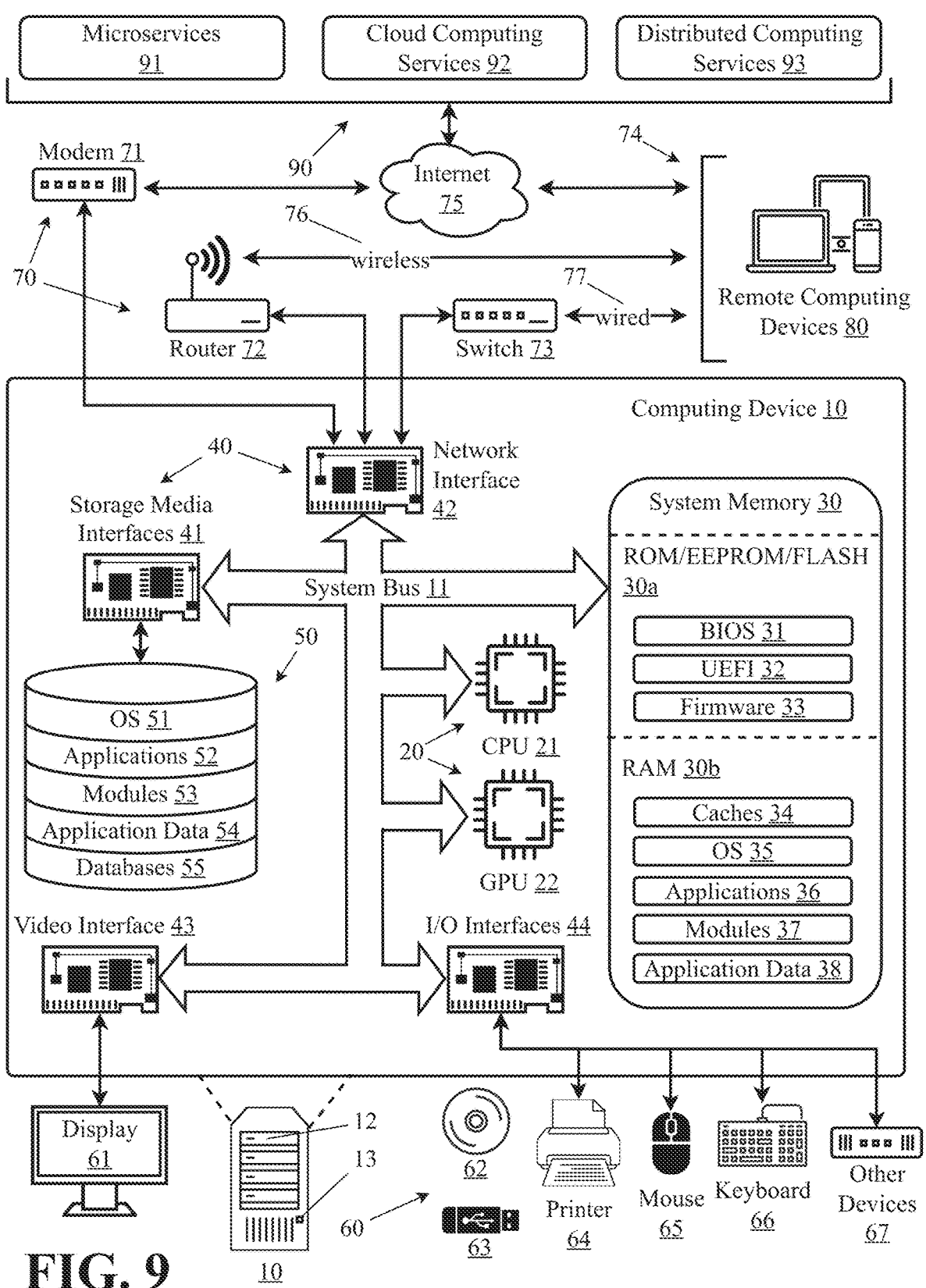
FIG. 9 illustrates an exemplary computing environment on which an embodiment described herein may be implemented.

FIG. 9 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 13 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random-access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like Docker and container orchestration systems like Kubernetes, is a common approach for deploying and managing applications. Containers are created from images, which are lightweight, standalone, and executable packages that include application code, libraries, dependencies, and runtime. Images are often built from a Dockerfile or similar, which contains instructions for assembling the image. Dockerfiles are configuration files that specify how to build a Docker image. Systems like Kubernetes also support containerd or CRI-O. They include commands for installing dependencies, copying files, setting environment variables, and defining runtime configurations. Docker images are stored in repositories, which can be public or private. Docker Hub is an exemplary public registry, and organizations often set up private registries for security and version control using tools such as Hub, JFrog Artifactory and Bintray, Gitlab, Github Packages or Container registries. Containers can communicate with each other and the external world through networking. Docker provides a bridge network by default, but can be used with custom networks. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerd resources is used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computer-implemented system for executing self-evolving property graphs, comprising:

one or more graphics processing units storing a dynamic property graph comprising vertices, edges, and associated properties, wherein the vertices comprise event vertices representing experiential inputs and communication vertices representing information exchanges;

a projection operator configured to receive input streams and map the streams to vertices in the dynamic property graph;

a plurality of operator kernels executable on the graphics processing units, the operator kernels configured to transform the dynamic property graph through geometric operations including information diffusion, path computation, and curvature analysis;

a graph execution controller configured to capture the operator kernels as a directed acyclic graph and repeatedly execute the directed acyclic graph to continuously update the dynamic property graph without external scheduling intervention;

an action density sampler configured to measure input stream density and provide density measurements to the graph execution controller, wherein the controller adjusts execution frequency based on a logarithmic relationship with the measured density; and a compression mechanism configured to identify and remove redundant graph elements based on geometric properties to maintain logarithmic memory growth with respect to cumulative input volume;

wherein continuous execution of the operator kernels transforms the input streams into trajectories through the dynamic property graph while maintaining bounded memory requirements.

2. The system of claim 1, wherein the operator kernels comprise:

a diffusion operator configured to propagate information along graph edges;

a geodesic operator configured to compute shortest paths between vertices;

a spectral operator configured to extract global structure through eigendecomposition;

a curvature operator configured to quantify local redundancy; and a recombination operator configured to generate novel trajectories through interpolation.

3. The system of claim 1, wherein the compression mechanism removes edges having curvature values below a dynamically adjusted threshold, and wherein the threshold is adjusted to maintain memory usage within a target bound proportional to the logarithm of processed input volume.

4. The system of claim 1, further comprising:

a hierarchical manifold structure comprising a fast manifold for processing events, a mesoscale manifold for decision trajectories, and a foundational manifold for long-term patterns; and bidirectional mappings between manifold layers configured to propagate abstractions upward and constraints downward.

5. The system of claim 4, wherein the bidirectional mappings compute a cognitive residual measuring divergence between upward abstractions and downward constraints, and wherein the foundational manifold is updated to minimize said cognitive residual.

6. The system of claim 1, wherein the graph execution controller comprises a CUDA Graph implementation that captures the operator kernels for repeated execution with modified parameters between executions.

7. The system of claim 1, wherein the projection operator employs a two-stage process comprising approximate nearest neighbor search followed by regularized assignment to determine vertex placement for new inputs.

8. The system of claim 1, wherein the dynamic property graph is stored using a hybrid representation comprising Compressed Sparse Row format for efficient traversal and Coordinate format journals for dynamic updates.

9. The system of claim 1, wherein the logarithmic relationship between execution frequency and input stream density prevents runaway acceleration while ensuring higher experiential density produces faster stabilization of the property graph structure.

10. A computer-implemented method for executing self-evolving property graphs, comprising the steps of:

storing a dynamic property graph in one or more graphics processing units, the dynamic property graph comprising vertices, edges, and associated properties, wherein the vertices comprise event vertices representing experiential inputs and communication vertices representing information exchanges;

receiving input streams and mapping the streams to vertices in the dynamic property graph using a projection operator;

transforming the dynamic property graph by executing a plurality of operator kernels on the graphics processing units, the operator kernels performing geometric operations including information diffusion, path computation, and curvature analysis;

capturing the operator kernels as a directed acyclic graph and repeatedly executing the directed acyclic graph to continuously update the dynamic property graph without external scheduling intervention;

measuring input stream density and adjusting execution frequency of the directed acyclic graph based on a logarithmic relationship with the measured density; and identifying and removing redundant graph elements based on geometric properties to maintain logarithmic memory growth with respect to cumulative input volume;

wherein continuous execution of the operator kernels transforms the input streams into trajectories through the dynamic property graph while maintaining bounded memory requirements.

11. The method of claim 10, wherein transforming the dynamic property graph comprises:

diffusing information along graph edges;

computing shortest paths between vertices;

extracting global structure through eigendecomposition;

quantifying local redundancy through curvature computation; and generating novel trajectories through interpolation.

12. The method of claim 10, wherein identifying and removing redundant graph elements comprises removing edges having curvature values below a dynamically adjusted threshold, and adjusting the threshold to maintain memory usage within a target bound proportional to the logarithm of processed input volume.

13. The method of claim 10, further comprising the steps of:

organizing the dynamic property graph into a hierarchical structure comprising a fast manifold for processing events, a mesoscale manifold for decision trajectories, and a foundational manifold for long-term patterns; and propagating abstractions upward and constraints downward through bidirectional mappings between manifold layers.

14. The method of claim 13, further comprising the steps of:

computing a cognitive residual measuring divergence between upward abstractions and downward constraints; and updating the foundational manifold to minimize said cognitive residual.

15. The method of claim 10, wherein repeatedly executing said directed acyclic graph comprises executing a CUDA Graph implementation with modified parameters between executions.

16. The method of claim 10, wherein mapping streams to vertices comprises:

performing approximate nearest neighbor search to identify candidate vertices; and performing regularized assignment to determine vertex placement for new inputs.

17. The method of claim 10, further comprising storing the dynamic property graph using a hybrid representation comprising Compressed Sparse Row format for efficient traversal and Coordinate format journals for dynamic updates.

* * * * *